(12) United States Patent
Hendry

(10) Patent No.: US 12,262,046 B2
(45) Date of Patent: Mar. 25, 2025

(54) INTER-PREDICTION-BASED IMAGE ENCODING/DECODING METHOD AND APPARATUS, AND RECORDING MEDIUM STORING BITSTREAM

(71) Applicant: LG ELECTRONICS INC., Seoul (KR)

(72) Inventor: Hendry Hendry, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 17/801,497

(22) PCT Filed: Feb. 25, 2021

(86) PCT No.: PCT/KR2021/002347
§ 371 (c)(1),
(2) Date: Aug. 22, 2022

(87) PCT Pub. No.: WO2021/172881
PCT Pub. Date: Sep. 2, 2021

(65) Prior Publication Data
US 2023/0082043 A1   Mar. 16, 2023

Related U.S. Application Data

(60) Provisional application No. 62/981,518, filed on Feb. 25, 2020.

(51) Int. Cl.
*H04N 19/52* (2014.01)
*H04N 19/105* (2014.01)
(Continued)

(52) U.S. Cl.
CPC .......... *H04N 19/52* (2014.11); *H04N 19/105* (2014.11); *H04N 19/109* (2014.11);
(Continued)

(58) Field of Classification Search
CPC .. H04N 19/105; H04N 19/109; H04N 19/174; H04N 19/176; H04N 19/513; H04N 19/52; H04N 19/577; H04N 19/70
See application file for complete search history.

(56) References Cited

U.S. PATENT DOCUMENTS

2004/0022179 A1   2/2004   Giannakis et al.
2018/0070092 A1   3/2018   Kim et al.
(Continued)

FOREIGN PATENT DOCUMENTS

CN   106101723 A   11/2016
CN   106210739 A   12/2016
(Continued)

OTHER PUBLICATIONS

Takeshi Chujoh et al., "On editorial improvements for specification of explicit weighted prediction", JVET-Q0129-v1, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-6, 27, see pp. 1-2 and 4-5.

(Continued)

*Primary Examiner* — Maria E Vazquez Colon
(74) *Attorney, Agent, or Firm* — Bryan Cave Leighton Paisner LLP

(57) ABSTRACT

An image decoding method and apparatus according to the present disclosure can determine an inter-prediction mode of a current block, derive motion information of the current block according to the determined inter-prediction mode, and obtain a prediction block of the current block, on the basis of the derived motion information.

11 Claims, 12 Drawing Sheets

(51) Int. Cl.
  *H04N 19/109* (2014.01)
  *H04N 19/174* (2014.01)
  *H04N 19/176* (2014.01)
  *H04N 19/577* (2014.01)
  *H04N 19/70* (2014.01)

(52) U.S. Cl.
  CPC ......... *H04N 19/174* (2014.11); *H04N 19/176* (2014.11); *H04N 19/577* (2014.11); *H04N 19/70* (2014.11)

(56) References Cited

U.S. PATENT DOCUMENTS

| | | | |
|---|---|---|---|
| 2019/0141333 A1 | 5/2019 | Lee | |
| 2020/0413078 A1* | 12/2020 | Li | H04N 19/132 |
| 2021/0266600 A1* | 8/2021 | Seregin | H04N 19/503 |

FOREIGN PATENT DOCUMENTS

| | | | |
|---|---|---|---|
| CN | 108781283 A | | 11/2018 |
| CN | 109891883 A | | 6/2019 |
| JP | 2020195014 A | * | 12/2020 |
| KR | 10-2012-0140623 A | | 12/2012 |
| KR | 10-2019-0053238 A | | 5/2019 |
| WO | 2012/148128 A2 | | 11/2012 |
| WO | 2016/072775 A1 | | 5/2016 |
| WO | 2019/194498 A1 | | 10/2019 |

OTHER PUBLICATIONS

Benjamin Bross et al., "Versatile Video Coding (Draft 6)", JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-43 9, see p. 214.

Seethal Paluri et al., "[AHG9]: Signalling the prediction weight table in the picture header", JVET-Q0247, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-5, see p. 4.

Hendry et al., "[AHG9]: On picture level and slice level tool parameters", JVET of ITU-T SG 16 WP 3 and ISO/IEC JTC 1/SC 29/WG 11, 17th Meeting: Brussels, BE, Jan. 7-17, 2020, Document: JVET-Q0200-v2.

Benjamin Bross et al., "Versatile Video Coding (Draft 8)", JVET of ITU-T SG 16 WP 3 and ISO/IEC JTC 1/SC 29/WG 11, 17th Meeting: Brussels, BE Jan. 7-17, 2020, Document: JVET-Q2001-vC.

* cited by examiner

INTER-PREDICTION-BASED IMAGE ENCODING/DECODING METHOD AND APPARATUS, AND RECORDING MEDIUM STORING BITSTREAM

This application is a National Stage Application of International Application No. PCT/KR2021/002347, filed on Feb. 25, 2021, which claims the benefit of and priority to U.S. Provisional Application No. 62/981,518, filed on Feb. 25, 2020, which are hereby incorporated by reference in their entirety for all purposes as if fully set forth herein.

BACKGROUND OF THE DISCLOSURE

Field of the Disclosure

The present disclosure relates to an image encoding/decoding method and apparatus, and a recording medium storing a bitstream.

Related Art

Recently, there is growing demand on high-resolution, high-quality images such as High Definition (HD) images and Ultra High Definition (UHD) images in various application fields, which leads to discussion on high-efficiency image compression techniques.

The image compression technique includes various techniques such as an inter-prediction technique which predicts a pixel value included in a current picture from a previous or next picture of the current picture, an intra-prediction technique which predicts the pixel value included in the current picture by using pixel information in the current picture, an entropy encoding technique which assigns a short code to a value occurring more frequently and assigns a long code to a value occurring less frequently, or the like. Image data may be transmitted or stored by being effectively compressed by using the image compression technique.

SUMMARY

The present disclosure provides a method and apparatus for improving image coding efficiency based on inter prediction.

The present disclosure provides a method and apparatus for effectively determining an inter-prediction mode.

The present disclosure provides a method and apparatus for effectively deriving motion information for inter prediction.

The present disclosure provides a weighted prediction method and apparatus for improving accuracy of inter prediction.

The present disclosure provides a method and apparatus for effectively encoding/decoding weighted prediction information for weighted prediction.

The present disclosure provides a computer readable storage medium storing a bitstream generated by an image encoding/decoding method and apparatus.

An image decoding method and apparatus according to the present disclosure may determine an inter-prediction mode of a current block, derive motion information of the current block according to the determined inter-prediction mode, and obtain a prediction block of the current block, based on the derived motion information.

In the image decoding method and apparatus according to the present disclosure, the prediction block may be obtained based on weighted prediction information for an explicit weighted prediction of the current block. The weighted prediction information may include at least one of weight common information, weight number information, a flag indicating whether a weight is present, weight delta information, or offset information.

In the image decoding method and apparatus according to the present disclosure, the weight number information may be adaptively signaled based on at least one of a first flag specifying a position at which the weighted prediction information is signaled and a second flag indicating whether the explicit weighted prediction is applied to a bi-predictive (B) slice.

In the image decoding method and apparatus according to an embodiment, the motion information of the current block may be derived based on a merge candidate list. The merge candidate list may include at least one of a spatial merge candidate, a temporal merge candidate, a history-based merge candidate, or an average merge candidate.

In the image decoding method and apparatus according to an embodiment, the deriving of the motion information of the current block may include modifying a motion vector among the derived motion information, by using a specific motion vector difference (MVD).

In the image decoding method and apparatus according to an embodiment, the MVD may be derived based on at least one of a length of the MVD, a direction of the MVD, or a picture order count (POC) difference between a reference picture of the current block and a current picture.

In the image decoding method and apparatus according to an embodiment, the obtaining of the prediction block of the current block may include obtaining weighted prediction information for the explicit weighted prediction of the current block, deriving at least one of a weight or offset for the explicit weighted prediction of the current block, by using the weighted prediction information, and performing weighted prediction of the current block, based on at least one of the derived weight or offset.

In the image decoding method and apparatus according to an embodiment, the weight number information may include weight number information of a list0 (L0) direction and weight number information of a list1 (L1) direction. The weight number information of the L0 direction may be adaptively signaled based on the first flag specifying the position at which the weighted prediction information is signaled. The weight number information of the L1 direction may be adaptively signaled based on the first flag specifying the position at which the weighted prediction information is signaled and the second flag indicating whether the explicit weighted prediction is applied to the B slice.

In the image decoding method and apparatus according to an embodiment, the first flag specifying the position at which the weighted prediction information is signaled may specify whether the weighted prediction information is present in a picture header or is present in a slice header. The second flag indicating whether the explicit weighted prediction is applied to the B slice may specify whether the explicit weighted prediction is applied or default weighted prediction is applied to the B slice.

In the image decoding method and apparatus according to an embodiment, if the weighted prediction information is present in the slice header according to the first flag or the explicit weighted prediction is not applied to the B slice according to the second flag, the weight number information of the L1 direction may be derived to be 0.

The image encoding method and apparatus according to an embodiment may determine an inter-prediction mode of a current block, derive motion information of the current block according to the determined inter-prediction mode, and obtain weighted prediction information for a weighted prediction of the current block.

In the image encoding method and apparatus according to an embodiment, the weighted prediction information may include least one of weight common information, weight number information, a flag indicating whether a weight is present, weight delta information, and offset information.

In the image encoding method and apparatus according to an embodiment, the weight number information may be adaptively encoded based on at least one of a first flag specifying a position at which the weighted prediction information is encoded or a second flag indicating whether an explicit weighted prediction is applied to a B slice.

In the image encoding method and apparatus according to an embodiment, the motion information of the current block may be derived based on a merge candidate list. The merge candidate list may include at least one of a spatial merge candidate, a temporal merge candidate, a history-based merge candidate, or an average merge candidate.

In the image encoding method and apparatus according to an embodiment, the deriving of the motion information of the current block may include modifying a motion vector among the derived motion information, by using a specific MVD.

In the image encoding method and apparatus according to an embodiment, the MVD may be derived based on at least one of a length of the MVD, a direction of the MVD, or a POC difference between a reference picture of the current block and a current picture.

In the image encoding method and apparatus according to an embodiment, the obtaining of the weighted prediction information for the weighted prediction of the current block may include determining at least one of a weight or offset for the weighted prediction of the current block, and obtaining weighted prediction information of the current block, based on at least one of the determined weight or offset.

In the image encoding method and apparatus according to an embodiment, the weight number information may include weight number information in an L0 direction and weight number information of an L1 direction. The weight number information of the L0 direction may be adaptively encoded based on the first flag specifying the position at which the weighted prediction information is encoded. The weight number information of the L1 direction may be adaptively encoded based on the first flag specifying the position at which the weighted prediction information is encoded and the second flag indicating whether the explicit weighted prediction is applied to the B slice.

In the image encoding method and apparatus according to an embodiment, the first flag specifying the position at which the weighted prediction information is signaled may specify whether the weighted prediction information is present in a picture header or is present in a slice header. The second flag indicating whether the explicit weighted prediction is applied to the B slice may specify whether the explicit weighted prediction is applied or default weighted prediction is applied to the B slice.

In the image encoding method and apparatus according to an embodiment, if the weighted prediction information is encoded in the slice header according to the first flag or the explicit weighted prediction is not applied to the B slice according to the second flag, the weight number information of the L1 direction may not be encoded.

In a computer readable storage medium storing encoded information causing an image decoding apparatus according to the present disclosure to perform an image decoding method, the image decoding method may include determining an inter-prediction mode of a current block, deriving motion information of the current block according to the determined inter-prediction mode, and obtaining a prediction block of the current block, based on the derived motion information.

In the computer readable storage medium according to the present disclosure, the prediction block may be obtained based on weighted prediction information for an explicit weighted prediction of the current block. The weighted prediction information may include at least one of weight common information, weight number information, a flag indicating whether a weight is present, weight delta information, or offset information.

In the computer readable storage medium according to the present disclosure, the weight number information may be adaptively signaled based on at least one of a flag specifying a position at which the weighted prediction information is signaled or a flag indicating whether the explicit weighted prediction is applied to a B slice.

Image coding efficiency may be improved through inter prediction according to the present disclosure.

According to the present disclosure, an inter-prediction mode may be effectively determined.

According to the present disclosure, motion information for inter prediction may be effectively derived.

Accuracy of inter prediction may be improved through weighted prediction according to the present disclosure.

According to the present disclosure, weighted prediction information for weighted prediction may be effectively encoded/decoded.

A computer readable storage medium storing a bitstream generated by an image encoding/decoding method and apparatus may be provided according to the present disclosure.

BEST MODE FOR CARRYING OUT THE DISCLOSURE

Figure 1:
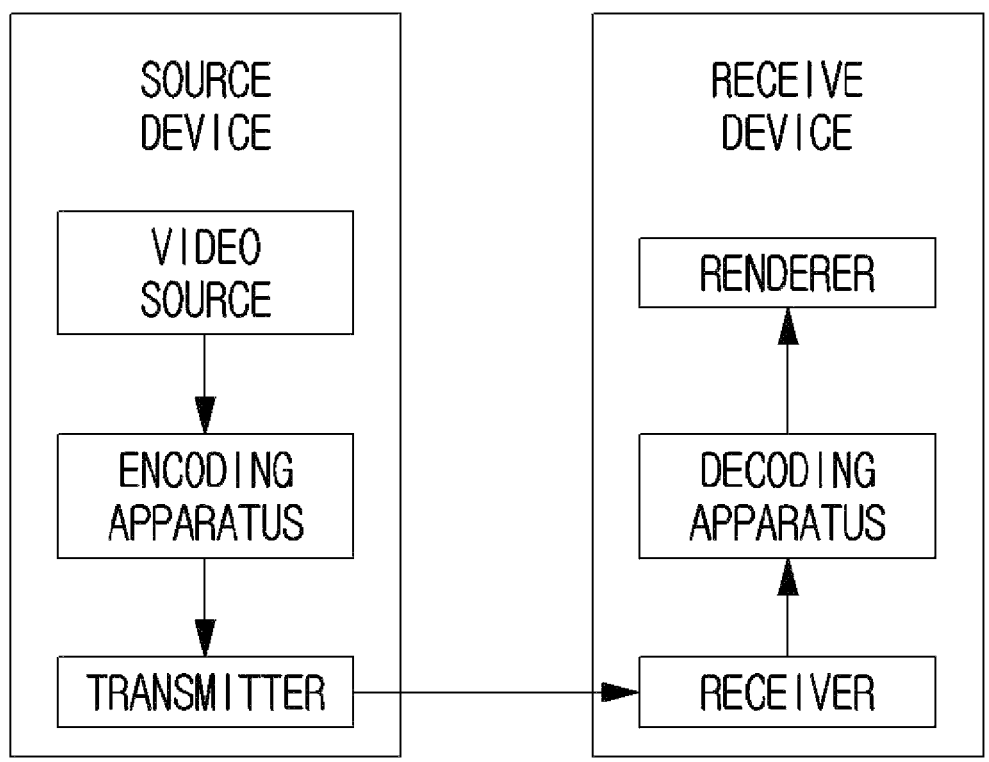
FIG. 1 illustrates a video/image coding system according to the present disclosure.

An image decoding method and apparatus according to the present disclosure may determine an inter-prediction mode of a current block, derive motion information of the current block according to the determined inter-prediction mode, and obtain a prediction block of the current block, based on the derived motion information.

In the image decoding method and apparatus according to the present disclosure, the prediction block may be obtained based on weighted prediction information for an explicit weighted prediction of the current block. The weighted prediction information may include at least one of weight common information, weight number information, a flag indicating whether a weight is present, weight delta information, or offset information.

In the image decoding method and apparatus according to the present disclosure, the weight number information may be adaptively signaled based on at least one of a first flag specifying a position at which the weighted prediction information is signaled or a second flag indicating whether the explicit weighted prediction is applied to a bi-predictive (B) slice.

In the image decoding method and apparatus according to an embodiment, the motion information of the current block may be derived based on a merge candidate list. The merge candidate list may include at least one of a spatial merge candidate, a temporal merge candidate, a history-based merge candidate, or an average merge candidate.

In the image decoding method and apparatus according to an embodiment, the deriving of the motion information of the current block may include modifying a motion vector among the derived motion information, by using a specific motion vector difference (MVD).

In the image decoding method and apparatus according to an embodiment, the MVD may be derived based on at least one of a length of the MVD, a direction of the MVD, or a picture order count (POC) difference between a reference picture of the current block and a current picture.

In the image decoding method and apparatus according to an embodiment, the obtaining of the prediction block of the current block may include obtaining weighted prediction information for the explicit weighted prediction of the current block, deriving at least one of a weight or offset for the explicit weighted prediction of the current block, by using the weighted prediction information, and performing weighted prediction of the current block, based on at least one of the derived weight or offset.

In the image decoding method and apparatus according to an embodiment, the weight number information may include weight number information of a list0 (L0) direction and weight number information of a list1 (L1) direction. The weight number information of the L0 direction may be adaptively signaled based on the first flag specifying the position at which the weighted prediction information is signaled. The weight number information of the L1 direction may be adaptively signaled based on the first flag specifying the position at which the weighted prediction information is signaled and the second flag indicating whether the explicit weighted prediction is applied to the B slice.

In the image decoding method and apparatus according to an embodiment, the first flag specifying the position at which the weighted prediction information is signaled may specify whether the weighted prediction information is present in a picture header or is present in a slice header. The second flag indicating whether the explicit weighted prediction is applied to the B slice may specify whether the explicit weighted prediction is applied or default weighted prediction is applied to the B slice.

In the image decoding method and apparatus according to an embodiment, if the weighted prediction information is present in the slice header according to the first flag or the explicit weighted prediction is not applied to the B slice according to the second flag, the weight number information of the L1 direction may be derived to be 0.

The image encoding method and apparatus according to an embodiment may determine an inter-prediction mode of a current block, derive motion information of the current block according to the determined inter-prediction mode, and obtain weighted prediction information for a weighted prediction of the current block.

In the image encoding method and apparatus according to an embodiment, the weighted prediction information may include least one of weight common information, weight number information, a flag indicating whether a weight is present, weight delta information, and offset information.

In the image encoding method and apparatus according to an embodiment, the weight number information may be adaptively encoded based on at least one of a first flag specifying a position at which the weighted prediction information is encoded or a second flag indicating whether an explicit weighted prediction is applied to a B slice.

In the image encoding method and apparatus according to an embodiment, the motion information of the current block may be derived based on a merge candidate list. The merge candidate list may include at least one of a spatial merge candidate, a temporal merge candidate, a history-based merge candidate, or an average merge candidate.

In the image encoding method and apparatus according to an embodiment, the deriving of the motion information of the current block may include modifying a motion vector among the derived motion information, by using a specific MVD.

In the image encoding method and apparatus according to an embodiment, the MVD may be derived based on at least one of a length of the MVD, a direction of the MVD, or a POC difference between a reference picture of the current block and a current picture.

In the image encoding method and apparatus according to an embodiment, the obtaining of the weighted prediction information for the weighted prediction of the current block may include determining at least one of a weight or offset for the weighted prediction of the current block, and obtaining weighted prediction information of the current block, based on at least one of the determined weight or offset.

In the image encoding method and apparatus according to an embodiment, the weight number information may include weight number information in an L0 direction and weight number information of an L1 direction. The weight number information of the L0 direction may be adaptively encoded based on the first flag specifying the position at which the weighted prediction information is encoded. The weight number information of the L1 direction may be adaptively encoded based on the first flag specifying the position at which the weighted prediction information is encoded and the second flag indicating whether the explicit weighted prediction is applied to the B slice.

In the image encoding method and apparatus according to an embodiment, the first flag specifying the position at which the weighted prediction information is signaled may specify whether the weighted prediction information is present in a picture header or is present in a slice header. The second flag indicating whether the explicit weighted prediction is applied to the B slice may specify whether the explicit weighted prediction is applied or default weighted prediction is applied to the B slice.

In the image encoding method and apparatus according to an embodiment, if the weighted prediction information is encoded in the slice header according to the first flag or the explicit weighted prediction is not applied to the B slice according to the second flag, the weight number information of the L1 direction may not be encoded.

In a computer readable storage medium storing encoded information causing an image decoding apparatus according to the present disclosure to perform an image decoding method, the image decoding method may include determining an inter-prediction mode of a current block, deriving motion information of the current block according to the determined inter-prediction mode, and obtaining a prediction block of the current block, based on the derived motion information.

In the computer readable storage medium according to the present disclosure, the prediction block may be obtained based on weighted prediction information for an explicit weighted prediction of the current block. The weighted prediction information may include at least one of weight common information, weight number information, a flag indicating whether a weight is present, weight delta information, or offset information.

In the computer readable storage medium according to the present disclosure, the weight number information may be adaptively signaled based on at least one of a flag specifying a position at which the weighted prediction information is signaled or a flag indicating whether the explicit weighted prediction is applied to a B slice.

DESCRIPTION OF EXEMPLARY EMBODIMENTS

This document may be modified in various ways and may have various embodiments, and specific embodiments will be illustrated in the drawings and described in detail. However, it is to be understood that the present disclosure is not limited to the disclosed embodiments, but, on the contrary, is intended to cover various modifications and equivalent arrangements included within the spirit and scope of the appended claims. Like reference numerals are used to indicate like elements throughout the drawings.

It will be understood that although the terms first and second are used herein to describe various elements, these elements should not be limited by these terms. These terms are only used to distinguish one element from another element. Thus, a first element discussed below may be termed a second element, and similarly, a second element may be termed a first element without departing from the scope of the present disclosure. As used herein the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

This disclosure relates to video/image coding. For example, the method/example disclosed in this specification may be applied to a method disclosed in the Versatile Video Coding (VVC) standard. Further, the method/example disclosed in this specification may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

In this document, a variety of embodiments relating to video/image coding may be provided, and, unless specified to the contrary, the embodiments may be performed in combination with each other.

In this specification, a video may mean a set of a series of images over time. A picture generally means a unit representing an image in a specific time zone, and a slice/tile is a unit constituting a part of the picture in coding. The slice/tile may include one or more coding tree units (CTUs). One picture may be constructed of one or more slices/tiles. One picture may be constructed of one or more tile groups. One tile is a rectangular region consisting of a plurality of CTUs within a particular tile column and a particular tile row in one picture. The tile column is a rectangular region of CTUs having a height equal to the height of the picture and a width specified by a syntax request or a picture parameter set. The tile row is a rectangular region of CTUs having a height specified by the picture parameter set and a weight equal to the width of the picture. CTUs within one tile are arranged consecutively according to a CTU raster scan, whereas tiles within one picture are arranged consecutively according to a raster scan of the tiles. One slice may include the integer number of complete tiles or the integer number of consecutive complete CTU rows within a tile of a picture that may be exclusively contained in a single NAL unit. Meanwhile, one picture may be partitioned into two or more sub-pictures. The sub-picture may be a rectangular region of one or more slices within the picture.

A pixel or a pel may mean a minimum unit constituting a single picture (or image). Further, a term 'sample' may be used as a term corresponding to the term pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information associated with the region. One unit may include one luma block and two chroma (e.g., cb, cr) blocks. The term 'unit' may be used interchangeably with a term, such as block or area, in some cases. In a general case, an M×N block may include samples (or a sample array) or a set (or an array) of transform coefficients consisting of M columns and N rows.

In this document, "A or B" may mean "only A", "only B" or "both A and B". In other words, "A or B" in this document may be interpreted as "A and/or B". For example, in this document "A, B or C" means "only A", "only B", "only C", or "any combination of A, B and C".

A slash (/) or comma (,) used in this document may mean "and/or". For example, "A/B" may mean "A and/or B".

Accordingly, "A/B" may mean "only A", "only B", or "both A and B". For example, "A, B, C" may mean "A, B, or C".

In this document, "at least one of A and B" may mean "only A", "only B" or "both A and B". Also, in this document, the expression "at least one of A or B" or "at least one of A and/or B" means "at least one It can be interpreted the same as "at least one of A and B".

Also, in this document, "at least one of A, B and C" means "only A", "only B", "only C", or "A, B and C" Any combination of A, B and C". Also, "at least one of A, B or C" or "at least one of A, B and/or C" means may mean "at least one of A, B and C".

Also, parentheses used in this specification may mean "for example". Specifically, when "prediction (intra prediction)" is indicated, "intra prediction" may be proposed as an example of "prediction". In other words, "prediction" in this document is not limited to "intra prediction", and "intra prediction" may be proposed as an example of "prediction". Also, even when "prediction (ie, intra prediction)" is indicated, "intra prediction" may be proposed as an example of "prediction".

Technical features that are individually described in one drawing in this document may be implemented individually or may be implemented at the same time.

FIG. 1 illustrates a video/image coding system according to the present disclosure.

Referring to FIG. 1, a video/image coding system may include a first device (a source device) and a second device (a reception device).

The source device may deliver encoded video/image information or data in the form of a file or streaming to the receiving device via a digital storage medium or network. The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, one or more cameras, video/image archives including previously captured video/images, and the like. The video/image generating device may include, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
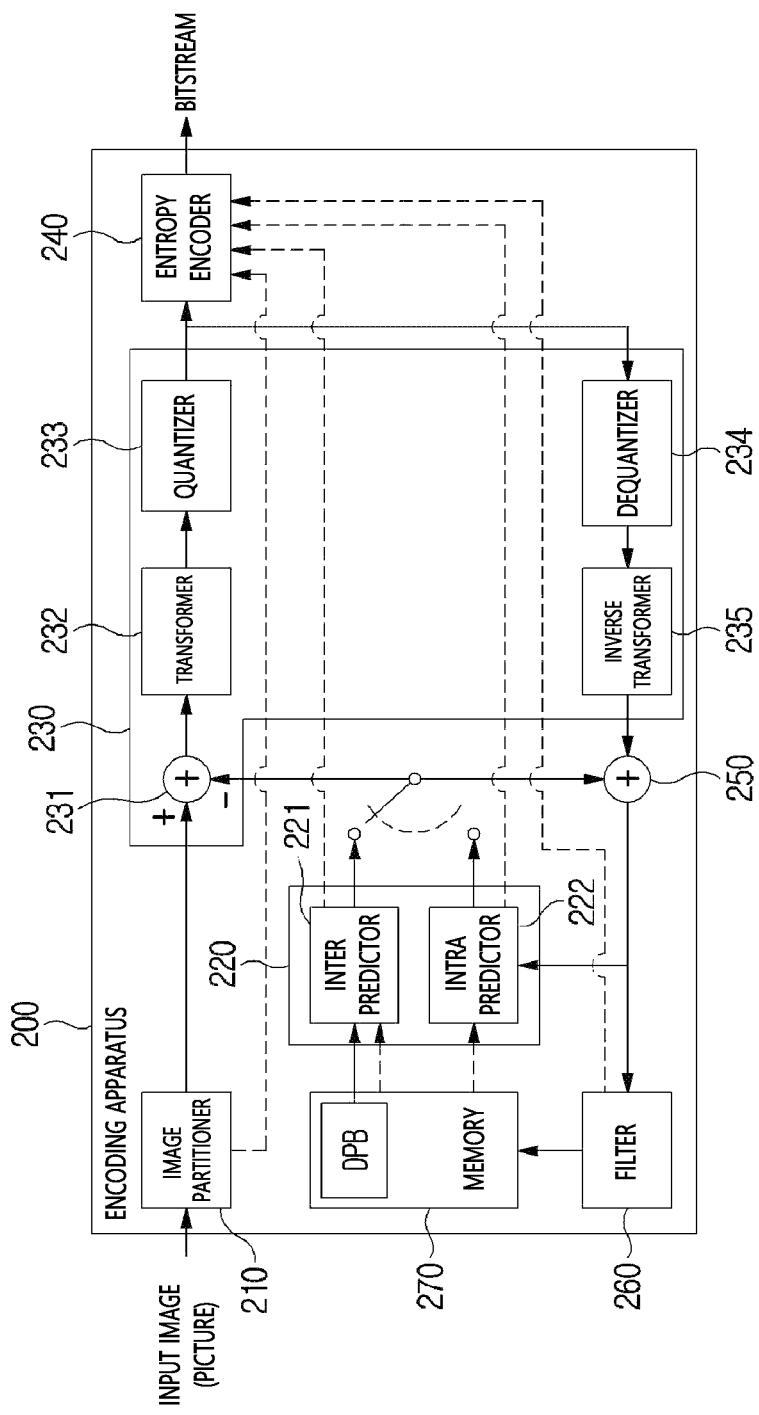
FIG. 2 is a schematic block diagram of an encoding apparatus in which encoding of a video/image signal is performed and to which embodiment(s) of the present specification is applicable.

FIG. 2 is a schematic block diagram of an encoding apparatus in which encoding of a video/image signal is performed and to which embodiment(s) of the present specification is applicable.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU).

For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may be first applied. A coding procedure according to the present disclosure may be performed based on a final coding unit which is not split any more. In this case, based on coding efficiency according to image characteristics or the like, the maximum coding unit may be directly used as the final coding unit, or optionally, the coding unit may be recursively split into coding units of a deeper depth, such that a coding unit having an optimal size may be used as the final coding unit. Herein, the coding procedure may include a procedure such as prediction, transform, and reconstruction to be described later.

As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, the unit for subtracting the predicted signal (predicted block, prediction sample array) from the input image signal (original block, original sample array) within the encoding apparatus 200 may be called the subtractor 231.

The predictor may perform prediction on a processing target block (hereinafter, referred to as a 'current block'), and may generate a predicted block including predicted samples for the current block. The predictor may determine whether intra prediction or inter prediction is applied in a current block or CU unit. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include at least one of a DC mode and a planar mode. The directional mode may include 33 directional prediction modes or 65 directional prediction modes according to fineness of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information about a palette index and a palette table. The predicted signal generated through the predictor (including the inter predictor 221 and/or the intra predictor 222) may be used to generate a reconstructed signal or used to generate a residual signal.

The transformer 232 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form.

The entropy encoder 240 may perform various encoding methods such as exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately.

The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in this document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering. Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include a deblocking filtering, a sample adaptive offset, an adaptive loop filter, a bilateral filter, and the like. The filter 260 may generate various filtering-related information to transfer the generated information to the entropy encoder 240. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
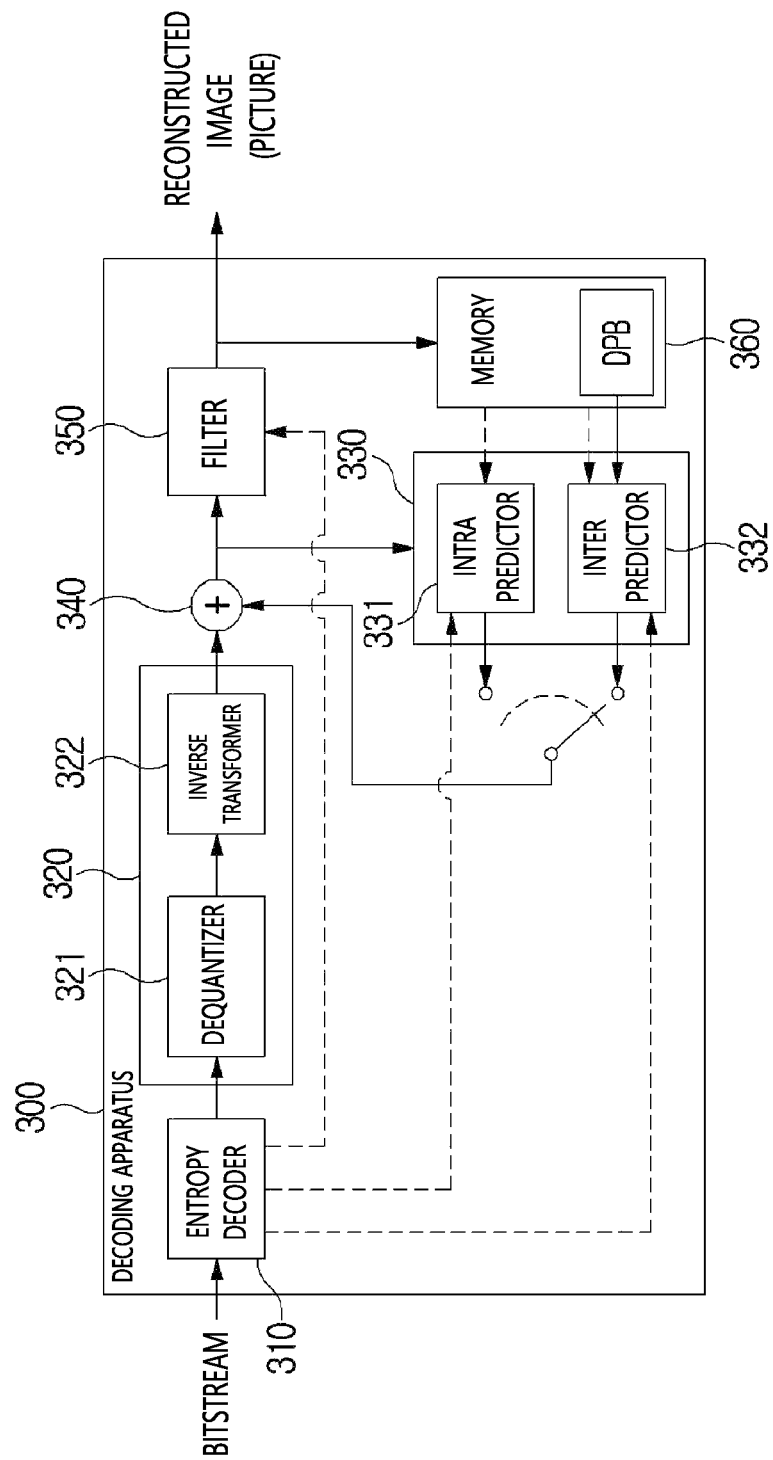
FIG. 3 is a schematic block diagram of a decoding apparatus in which decoding of a video/image signal is performed and to which embodiment(s) of the present specification is applicable.

FIG. 3 is a schematic block diagram of a decoding apparatus in which decoding of a video/image signal is performed and to which embodiment(s) of the present specification is applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322.

The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in this document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310.

Meanwhile, the decoding apparatus according to this document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP) mode. Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information about a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture. Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present specification, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

Figure 4:
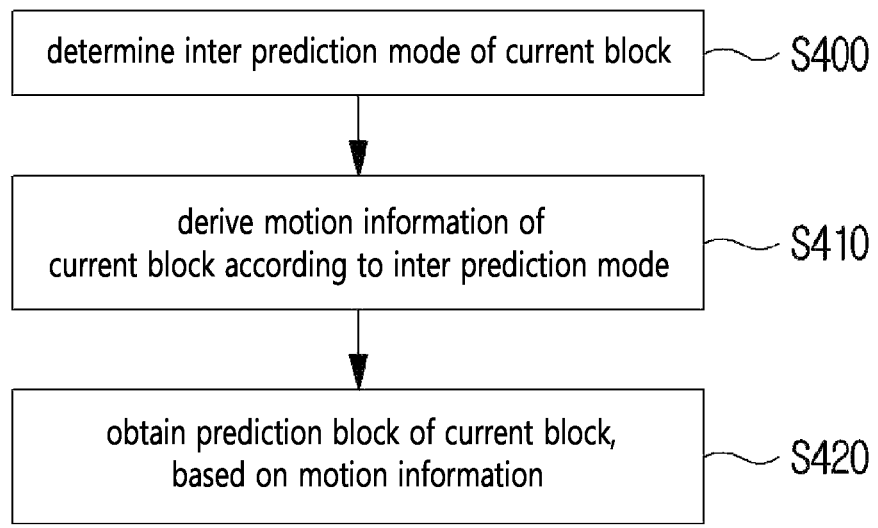
FIG. 4 illustrates an inter prediction method in a decoding apparatus according to the present disclosure.

FIG. 4 illustrates an inter prediction method in a decoding apparatus according to the present disclosure.

Referring to FIG. 4, an inter-prediction mode of a current block may be determined (S400).

At least one of a plurality of inter-prediction modes pre-defined in the decoding apparatus may be determined as the inter-prediction mode of the current block. Herein, the plurality of inter-prediction modes may include various modes such as a skip mode, a merge mode, a motion vector prediction (MVP) mode, a subblock merge mode, an affine mode, a merge with MVD (MMVD) mode, a combined inter and intra prediction (CIIP) mode, or the like. The affine mode may be called an affine motion prediction mode. The MVP mode may be referred to as advanced motion vector prediction (AMVP) mode.

In addition, a decoder side motion vector refinement (DMVR) mode, an adaptive motion vector resolution (AMVR) mode, a bi-directional flow (BDOF), or the like may also be used as additional modes additionally or alternatively.

Prediction mode information indicating the inter-prediction mode of the current block may be signaled from the encoding apparatus to the decoding apparatus. The prediction mode information may be included in the bitstream and received by the decoding apparatus. The prediction mode information may include index information indicating one of a plurality of candidate modes. Alternatively, the inter-prediction mode may be indicated through hierarchical signaling of flag information. In this case, the prediction mode information may include one or more flags.

For example, a skip flag may be signaled to indicate whether a skip mode is applied, and if the skip mode is not applied, a merge flag may be signaled to indicate whether a merge mode is applied. If the merge mode is not applied, an MVP mode may be applied, or additionally, a flag for identifying the inter-prediction mode may be further signaled. The affine mode may be signaled as an independent mode, or may be signaled as a mode dependent on the merge mode or the MVP mode. For example, in concept, the affine mode may include an affine merge mode and an affine MVP mode.

Meanwhile, if the merge mode is not applied to information (inter_pred_idc) indicating whether a list0 (L0) prediction, a list1 (L1) prediction, or a bi-prediction is used in the current block may be signaled in the current block. The information may be referred to as motion prediction direction information, inter prediction direction information, or inter prediction indication information. In the present specification, for convenience of explanation, an inter prediction type (L0 prediction, L1 prediction, or BI prediction) indicated by the syntax element inter_pred_idc may be indicated as a motion prediction direction. The L0 prediction, the L1 prediction, and the bi-prediction may be respectively represented as pred_L0, pred_L1, and pred_BI.

One picture may include one or more slices. The slice may have any one of slice types including an intra (I) slice, a predictive (P) slice, and a bi-predictive (B) slice. The slice type may be indicated based on slice type information. For blocks in the I slice, inter prediction may not be used and only intra prediction may be used. Of course, even in this case, an original sample value may be coded and signaled without prediction. For blocks in the P slice, the intra prediction or the inter prediction may be used, and only a uni-prediction may be used when the inter prediction is used. Meanwhile, for blocks in the B slice, the intra prediction and/or the inter prediction may be used, and not only the uni-prediction but also the bi-prediction may be used when the inter prediction is used.

L0 and L1 may include reference pictures which are encoded/decoded before the current picture. For example, L0 may include reference pictures before and/or after the current picture in POC order, and L1 may include reference pictures after and/or before the current picture in POC order. In this case, L0 may be assigned a lower reference picture index relative to previous reference pictures in the POC order than the current reference pictures, and L1 may be assigned a lower reference picture index relative to previous reference pictures in the POC order than the current picture. In the case of the B slice, the bi-prediction may be applied, and in this case, a uni-directional bi-prediction may be applied or a bidirectional bi-prediction may be applied. The bidirectional bi-prediction may be called a true bi-prediction.

The information on the inter-prediction mode of the current block may be coded at a level such as CU (CU syntax) and signaled, or may be implicitly determined according to a specific condition. The information may be explicitly signaled in some modes, and may be implicitly derived in the other modes.

For example, the CU syntax may define information on the (inter) prediction mode as follows. cu_skip_flag may indicate whether a skip mode is applied to the current block CU. pred_mode_ibc_flag may indicate whether the current block is a block coded in the IBC prediction mode. For example, pred_mode_ibc_flag having a value of 1 may specify that the current block is coded in the IBC prediction mode, and pred_mode_ibc_flag having a value of 0 may specify that the current block is not coded in the IBC prediction mode. Herein, the IBC prediction mode means a mode in which the prediction is performed by referring to a region belonging to the same picture as the current block and pre-reconstructed before the current block, and the pre-reconstructed region may be specified by a specific motion vector.

general_merge_flag may indicate that the general merge is available. When the value of general_merge_flag is 1, a regular merge mode, an mmvd mode, and a merge subblock mode (subblock merge mode) may be used. For example, when the value of general_merge_flag is 1, the merge data syntax may be parsed from the encoded video/image information (or bit stream) and the merge data syntax may be configured/coded to include the following information.

merge_subblock_flag may indicate whether the subblock-based merge mode (or affine merge mode) is applied to the current block. merge_subblock_idx may specify the merge candidate index of the subblock-based merge candidate list. regular_merge_flag may indicate whether the merge mode (i.e., regular merge mode) is applied to the current block. For example, if the value of regular_merge_flag is 1, the regular merge mode or the merge mode with motion vector difference (MMVD) may be used to derive motion information of the current block.

mmvd_merge_flag may indicate whether MMVD is applied to the current block. Herein, the MMVD may mean a mode in which a motion vector is corrected by adding a specific MVD to a motion vector pre-derived according to the merge mode. For example, if the value of mmvd_merge_flag is 1, the MMVD may be used to derive motion information of the current block. mmvd_cand_flag may indicate whether a first candidate of the merge candidate list is used or a second candidate thereof is used as the motion vector according to the merge mode.

ciip_flag may indicate whether a CIIP mode is applied to the current block. The CIIP mode means a method in which an inter-prediction block and an intra-prediction block are generated respectively through the inter-prediction and intra-prediction for the current block, and a final prediction block of the current block is generated through weighted-summation of the inter-prediction block and the intra-prediction block. Herein, the inter-prediction block may be performed based on at least any one of the aforementioned inter-prediction modes. Alternatively, the inter-prediction block may be generated by using only a merge mode (particularly, a regular merge mode) among the aforementioned inter-prediction modes. The intra-prediction block may be generated by using only a non-directional mode (e.g., a planar mode) among pre-defined intra-prediction modes.

Referring to FIG. 4, motion information of the current block may be derived based on the determined inter-prediction mode (S410).

The motion information may include at least one of a motion vector (mv), a reference picture index (refIdx), and a prediction direction flag (predFlagL0, predFlagL1). The motion vector may specify a position of a reference block, and the reference picture index may specify a reference picture of the current block among one or more reference pictures belonging to a reference picture list. In addition, predFlagL0 may indicate whether the L0 prediction is performed, and predFlagL1 may indicate whether the L1 prediction is performed. When a merge mode is applied, the motion information of the current block is not directly transmitted, and the motion information of the current prediction block is derived using motion information of a neighboring block. Therefore, the motion information of the current block may be indicated by transmitting flag information indicating that the merge mode is used and a merge index specifying a merge candidate of the current block in the merge candidate list. The merge mode may be called a regular merge mode. For example, the merge mode may be applied when the value of regular_merge_flag is 1.

Figure 5:
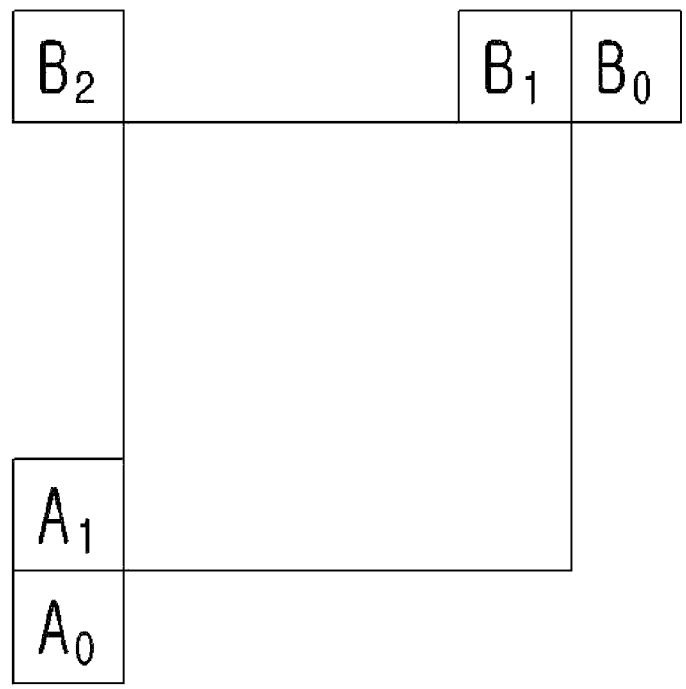
FIG. 5 to FIG. 7 illustrate a method of deriving motion information in a merge mode according to the present disclosure.

Hereinafter, a method of deriving motion information based on a merge mode will be described in detail with reference to FIG. 5 to FIG. 7.

A merge candidate list may be configured by using five merge candidate blocks. For example, four spatial merge candidates and one temporal candidate may be used. In case of the spatial merge candidate, all or some of the blocks of FIG. 5 may be used as the spatial merge candidate.

A coding apparatus (encoder/decoder) inserts spatial merge candidates derived by searching for spatial neighboring blocks of the current block into the merge candidate list. For example, the spatial neighboring blocks may include a bottom left corner neighboring block, a left neighboring block, a top right corner neighboring block, a top neighboring block, and a top left corner neighboring block of the current block. However, this is merely an example and, in addition to the above-described spatial neighboring blocks, additional neighboring blocks such as a right neighboring block, a bottom neighboring block, and a bottom right neighboring block may be used as the spatial neighboring blocks.

The coding apparatus may search for the spatial neighboring blocks based on a priority to detect available blocks, and may derive motion information of the detected blocks as the spatial merge candidates. For example, an encoding apparatus and a decoding apparatus may search for the five blocks shown in FIG. 5 in order of A1, B1, B0, A0, and B2 and sequentially index the available candidates to configure a merge candidate list. However, without being limited thereto, the five blocks may also be searched in order of B1, A1, B0, A0, and B2. A block at a position B2 may be searched only when at least one of blocks at positions A1, B1, B0, A0, and B2 is not available. Herein, a case where it is not available may be a case of belonging to a slice or tile different from that of the current block, a case where a corresponding block is encoded in an intra mode, or the like.

In addition, a redundancy check may be performed between spatial neighboring blocks to insert a spatial merge candidate. This is to exclude a spatial neighboring block having the same motion information as a spatial neighboring block predetermined as the spatial merge candidate from the merge candidate list. However, the redundancy check may be performed only between pre-defined block pairs to reduce computational complexity. Herein, the block pair may be defined such as (A1, B1), (B0, B1), (A0, A1), (B1, B2), (A1, B2). That is, if the spatial neighboring block at the position B1 is available, it may be checked whether the spatial neighboring blocks at the positions A1 and B0 have the same motion information as the spatial neighboring block at the position B1. If the spatial neighboring block at the position A1 is available, it may be checked whether the spatial neighboring block at the position A1 has the same motion information as the spatial neighboring block at the position A1. In case of having the same motion information as a result of the redundancy check, a corresponding spatial neighboring block may not be inserted into the merge candidate list. However, the block pair is for exemplary purposes only, and may also be defined such as (A0, A1), (A0, B0), (B0, B1), (B0, B2), (A0, B2).

The coding apparatus inserts the temporal merge candidate derived by searching for the temporal neighboring block of the current block into the merge candidate list. The temporal neighboring block may belong to a reference picture which is a picture different from the current picture to which the current block belongs. The reference picture in which the temporal neighboring block is located may be called a collocated picture or a col picture. The temporal neighboring block may be searched in order of the bottom right corner neighboring block and the bottom right center block of the co-located block for the current block on the col picture.

Figure 6:
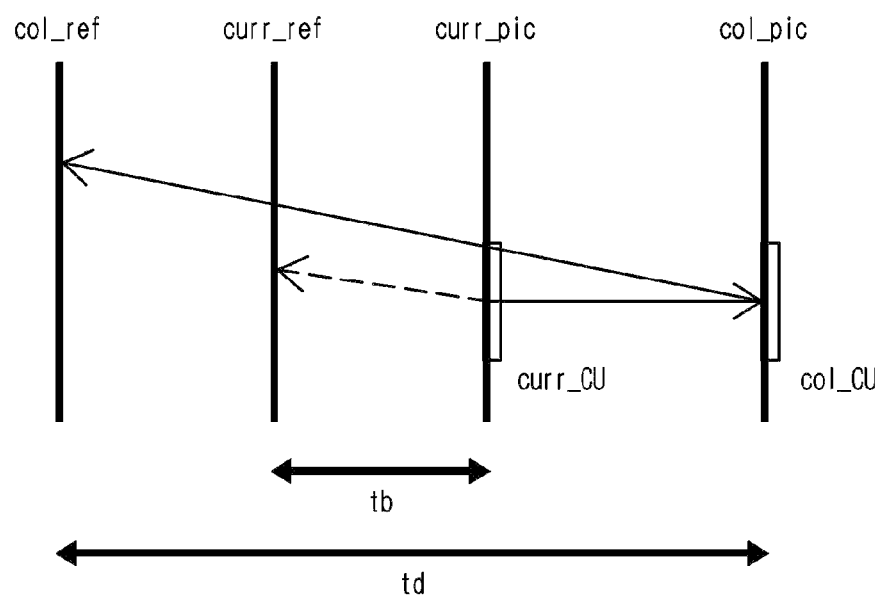
Figure 7:
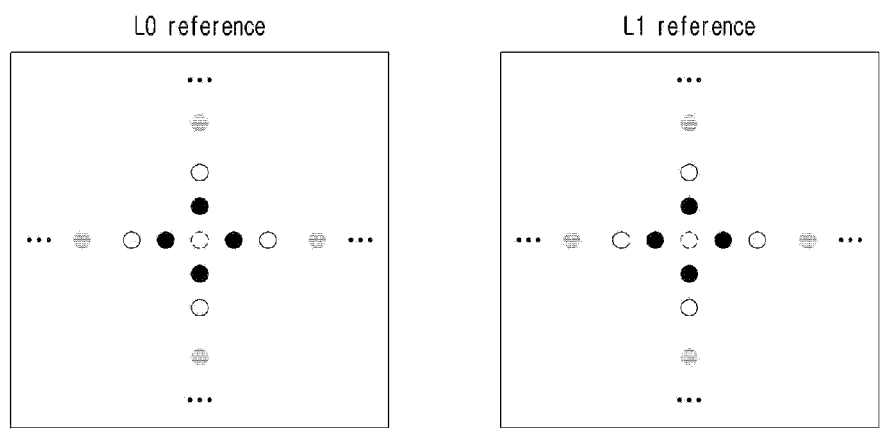

Meanwhile, referring to FIG. 6, in the process of deriving the temporal merge candidate, a scaled motion vector may be derived based on a temporal neighboring block belonging to the col picture. A reference picture list used to derive the temporal neighboring block may be explicitly signaled in a slice header. The scaled motion vector of the temporal merge candidate may be obtained by applying a specific POC distances tb and td to the motion vector of the temporal neighboring block. Herein, tb may be defined to be a POC difference between a current picture and a reference picture of the current picture, and td may be defined to be a POC difference between a col picture and a reference picture of the col picture. The reference picture index of the temporal merge candidate may be set to 0 irrespective of the temporal neighboring block, or may be set to a reference picture index of the temporal neighboring block.

Meanwhile, when motion data compression is applied, specific motion information may be stored as representative motion information for each predetermined storage unit in the col picture. In this case, it is not necessary to store the motion information for all the blocks in the predetermined storage unit, thereby obtaining a motion data compression effect. In this case, the predetermined storage unit may be previously determined in 16×16 sample units, 8×8 sample units, or the like, or size information on the predetermined storage unit may be signaled from the encoding apparatus to the decoding apparatus.

When the motion data compression is applied, motion information of the temporal neighboring block may be substituted with representative motion information of the predetermined storage unit in which the temporal neighboring block is located. That is, in this case, in an implementation aspect, after being arithmetically shifted to the right by a specific value, based on not a prediction block located at a coordinate of the temporal neighboring block but a coordinate (top left sample position) of the temporal neighboring block, the temporal merge candidate may be derived based on motion information of a prediction block which covers a position arithmetically shifted to the left.

For example, if the predetermined storage unit is a 2n×2n sample unit, assuming that the coordinate of the temporal neighboring block is (xTnb, yTnb), motion information of the prediction block located at a modified position ((xTnb>>n)<<n), (yTnb>>n)<<n)) may be used for the temporal merge candidate. Specifically, if the predetermined storage unit is a 16×16 sample unit, assuming that the coordinate of the temporal neighboring block is (xTnb, yTnb), motion information of the prediction block located at a modified position ((xTnb>>4)<<4), (yTnb>>4)<<4)) may be used for the temporal merge candidate. Alternatively, if the predetermined storage unit is an 8×8 sample unit, assuming that the coordinate of the temporal neighboring block is (xTnb, yTnb), motion information of the prediction block located at a modified position ((xTnb>>3)<<3), (yTnb>>3)<<3)) may be used for the temporal merge candidate.

The coding apparatus may determine whether the number of current merge candidate(s) is less than the maximum number of merge candidates. The maximum number of merge candidates may be predefined or may be signaled from the encoding apparatus to the decoding apparatus. For example, the encoding apparatus may generate information on the maximum number of merge candidates, encode the information, and transmit the encoded information to the decoding apparatus in the form of a bitstream. If the number of the current merge candidates is equal to the maximum number of merge candidates, an additional merge candidate inserting process may not be performed.

As a result of the checking, if the number of the current merge candidates is less than the maximum number of merge candidates, the coding apparatus inserts the additional merge candidate into the merge candidate list. The additional merge candidate may include at least one of a history based merge candidate(s), a pair-wise average merge candidate(s), an ATMVP, and a combined bi-predictive merge candidate (when the slice/tile group type of the current slice/tile group is B) and/or a zero vector merge candidate.

The history-based merge candidate may be added to the merge candidate list, and may be added after the spatial merge candidate and a temporal merge candidate. That is, the motion information of a pre-coded block may be stored in a table or buffer having a specific size, and may be used as a merge candidate of the current block. Hereinafter, the pre-coded block stored in the table or motion information of the pre-coded block is called an HVMP candidate.

The table includes a plurality of HMVP candidates, but the number of HMVP candidates may be re-set to 0 in unit of CTU rows. When the pre-coded block is coded in the inter-mode and it is not a subblock-based merge mode, the pre-coded block may be added to the table as the HMVP candidate. In this case, the pre-coded block may be added to a last entry of the table, or may be added to a first entry. A size of the table is 5, which may mean that up to 5 HMVP candidates may be added to the table. When a new HMVP candidate is added, the pre-stored HVMP candidate may be removed from the table (i.e., in a first-in-first-out manner). However, if HMVP candidates having the same motion information as the newly added HMVP candidate exist in the table, the HVMP candidate having the same motion information may be removed from the table. After being removed, all or some of the remaining HMVP candidate move forward in the table. For example, if an i-th HMVP candidate is removed, an (i+1)-th HMVP candidate moves to a position of the i-th HMVP candidate, and an (i+2)-th HMVP candidate moves to a position of the (i+1)-th HMVP candidate. Next, the newly added HMVP candidate may be added to the last entry of the table.

A redundancy check may be performed on H HMVP candidate(s) recently added among the HMVP candidates belonging to the table and spatial/temporal merge candidates. However, to reduce the number of redundancy check operations, the number H of the HMVP candidates used to generate the merge candidate list may be determined variably based on the number N of the merge candidates existing in the merge candidate list. For example, if the number N of the merge candidates existing in the merge candidate list is less than or equal to 4, the number H may be set to the number of the available HMVP candidates in the table. Otherwise, if the number N of the merge candidates existing in the merge candidate list is greater than 4, the number H may be set to (8−N). However, the history-based merge candidate may be added only until the number of current merge candidates in the merge candidate list reaches (the maximum number of merge candidates−1).

In addition, in the present specification, the pair-wise average merge candidate may also be referred to as an average merge candidate, a pair-wise average candidate, or a pair-wise candidate. Pairwise average candidates may be generated by averaging pre-defined merge candidate pairs among merge candidates in the merge candidate list. The merge candidate pair is defined as {(0, 1), (0, 2), (1, 2), (0, 3), (1, 3), (2, 3)}, where the numbers denote the merge indices of the merge candidate list. If the number of the current merge candidates of the merge candidate list does not reach the maximum number of merge candidates even after the average merge candidate is added to the merge candidate list, a zero-vector merge candidate may be added to the last entry of the merge candidate list. The zero-vector merge candidate may be added until the number of the current merge candidates of the merge candidate list reaches the maximum number of merge candidates.

Hereinafter, a method of deriving an average merge candidate will be described in detail. For convenience of explanation, any one merge candidate in the existing merge candidate list is called a first merge candidate, and another merge candidate is called a second merge candidate.

Motion information of the average merge candidate may be derived by a weighted average of motion information of the first merge candidate and second merge candidate. Herein, a weight of the weighted average is [1:1], [1:2], [1:3], [2:3], or the like, but is not limited thereto. The weight may be pre-defined in an encoding/decoding apparatus, or may be derived in the decoding apparatus. In this case, the weight may be derived by considering at least one of a distance between the current picture and the reference picture of the merge candidate and a prediction direction of the merge candidate. Alternatively, the motion information of the average merge candidate may be derived by obtaining and combining motion information of an L0 direction from the first merge candidate and motion information of an L1 direction from the second merge candidate. The motion information of the average merge candidate may be derived based on at least one of the aforementioned deriving methods, which may be performed by considering a prediction direction of a merge candidate to be combined, as described below.

1. When Uni-Directional Prediction is Applied to Both the First Merge Candidate and the Second Merge Candidate (CASE 1) When the L0 prediction is applied to the first merge candidate and the L1 prediction is applied to the second merge candidate, the reference picture index of the L0 direction of the average merge candidate may be derived as the reference picture index of the first merge candidate. A prediction direction flag of the L0 direction of the average merge candidate may be derived to be 1. The motion vector of the L0 direction of the average merge candidate may be derived as the motion vector of the first merge candidate. A reference picture index of the L1 direction of the average merge candidate may be derived as the reference picture index of the second merge candidate. A prediction direction flag of the L1 direction of the average merge candidate may be derived to be 1. A motion vector of the L1 direction of the average merge candidate may be derived as the motion vector of the second merge candidate.

(CASE 2) When the L1 prediction is applied to the first merge candidate and the L0 prediction is applied to the second merge candidate, the reference picture index of the L0 direction of the average merge candidate may be derived as the reference picture index of the second merge candidate. A prediction direction flag of the L0 direction of the average merge candidate may be derived to be 1. The motion vector of the L0 direction of the average merge candidate may be derived as the motion vector of the second merge candidate. A reference picture index of the L1 direction of the average merge candidate may be derived as the reference picture index of the first merge candidate. A prediction direction flag of the L1 direction of the average merge candidate may be derived to be 1. A motion vector of the L1 direction of the average merge candidate may be derived as the motion vector of the first merge candidate.

(CASE 3) When the L0 prediction is applied to the first merge candidate and the second merge candidate, the reference picture index of the L0 direction of the average merge candidate may be derived as the reference picture index of any one of the first merge candidate and the second merge candidate. For example, between the first merge candidate and the second merge candidate, a reference picture index of a merge candidate having a smallest index may be set to the reference picture index of the L0 direction of the average merge candidate. A prediction direction flag of the L0 direction of the average merge candidate may be derived to be 1. A motion vector of the L0 direction of the average merge candidate may be derived by a weighted average of the motion vector of the first merge candidate and second merge candidate. The reference picture index of the L1 direction of the average merge candidate may be derived to be −1. The prediction direction flag of the L1 direction may be derived to be 0. The motion information of the L1 direction may be derived to be 0.

(CASE 4) When the L1 prediction is applied to the first merge candidate and the second merge candidate, the reference picture index of the L0 direction of the average merge candidate may be derived to be −1. The prediction direction flag of the L0 direction may be derived to be 0. The motion information of the L0 direction may be derived to be 0. A reference picture index of the L1 direction of the average merge candidate may be derived as the reference picture index of any one of the first merge candidate and the second merge candidate. For example, between the first merge candidate and the second merge candidate, a reference picture index of a merge candidate having a smallest index may be set to the reference picture index of the L1 direction of the average merge candidate. A prediction direction flag of the L1 direction of the average merge candidate may be derived to be 1. A motion vector of the L1 direction of the average merge candidate may be derived by a weighted average of the motion vector of the first merge candidate and second merge candidate.

2. When the Bi-Directional Prediction is Applied to Both the First Merge Candidate and the Second Merge Candidate (CASE 5) A reference picture index of the L0 direction of the average merge candidate may be derived as the reference picture index of any one of the first merge candidate and the second merge candidate. For example, between the first merge candidate and the second merge candidate, a reference picture index of a merge candidate having a smallest index may be set to the reference picture index of the L0 direction of the average merge candidate. A prediction direction flag of the L0 direction of the average merge candidate may be derived to be 1. A motion vector of the L0 direction of the average merge candidate may be derived by a weighted average of the motion vector of the first merge candidate and second merge candidate. A reference picture index of the L1 direction of the average merge candidate may be derived as the reference picture index of any one of the first merge candidate and the second merge candidate. For example, between the first merge candidate and the second merge candidate, a reference picture index of a merge candidate having a smallest index may be set to the reference picture index of the L1 direction of the average merge candidate. A prediction direction flag of the L1 direction of the average merge candidate may be derived to be 1. A motion vector of the L1 direction of the average merge candidate may be derived by a weighted average of the motion vector of the first merge candidate and second merge candidate.

3. When the Bi-Directional Prediction is Applied to the First Merge Candidate, and the Uni-Directional Prediction is Applied to the Second Merge Candidate (CASE 6) When the L0 prediction is applied to the second merge candidate, the reference picture index of the L0 direction of the average merge candidate may be derived as the reference picture index of any one of the first merge candidate and the second merge candidate. For example, between the first merge candidate and the second merge candidate, a reference picture index of a merge candidate having a smallest index may be set to the reference picture index of the L0 direction of the average merge candidate. A prediction direction flag of the L0 direction of the average merge candidate may be derived to be 1. A motion vector of the L0 direction of the average merge candidate may be derived by a weighted average of the motion vector of the first merge candidate and second merge candidate. A prediction direction flag of the L1 direction of the average merge candidate may be derived to be 1. A motion vector of the L1 direction of the average merge candidate may be derived as the motion vector of the first merge candidate.

(CASE 7) When the L1 prediction is applied to the second merge candidate, the reference picture index of the L0 direction of the average merge candidate may be derived as the reference picture index of the first merge candidate. A prediction direction flag of the L0 direction of the average merge candidate may be derived to be 1. The motion vector of the L0 direction of the average merge candidate may be derived as the motion vector of the first merge candidate. A reference picture index of the L1 direction of the average merge candidate may be derived as the reference picture index of any one of the first merge candidate and the second merge candidate. For example, between the first merge candidate and the second merge candidate, a reference picture index of a merge candidate having a smallest index may be set to the reference picture index of the L1 direction of the average merge candidate. A prediction direction flag of the L1 direction of the average merge candidate may be derived to be 1. A motion vector of the L1 direction of the average merge candidate may be derived by a weighted average of the motion vector of the first merge candidate and second merge candidate.

As a result of the checking, if the number of the current merge candidates is not less than the number of the maximum merge candidates, the coding apparatus may stop configuring of the merge candidate list. In this case, an encoding apparatus may select an optimal merge candidate among merge candidates configuring the merge candidate list based on a rate-distortion (RD) cost, and signal selection information (ex. merge index) indicating the selected merge candidate to a decoding apparatus. The decoding apparatus may select the optimal merge candidate based on the merge candidate list and the selection information.

The motion information of the selected merge candidate may be used as the motion information of the current block. Alternatively, a motion vector of the selected merge candidate may be corrected by using a motion vector difference (MVD) having a specific length and direction as shown in FIG. 7, and the motion vector corrected based on the MVD may be used as the motion vector of the current block.

At least one of mmvd_distance_idx and mmvd_direction_idx may be used to derive the MVD. mmvd_distance_idx may denote an index used to derive an MVD length (MmvdDistance), and mmvd_direction_idx may denote an index used to derived an MVD direction or sign (MmvdSign). For example, the MVD may be derived as shown in Equation 1 below.

$$MmvdOffset[x0][y0][0]=(MmvdDistance[x0][y0]<<2)*MmvdSign[x0][y0][0]$$

$$MmvdOffset[x0][y0][1]=(MmvdDistance[x0][y0]<<2)*MmvdSign[x0][y0][1] \quad \text{[Equation 1]}$$

Herein, MmvdDistance may be derived as shown in Table 1 below, based on mmvd_distance_idx and a specific flag (ph_mmvd_fullpel_only_flag).

TABLE 1

| mmvd_distance_idx | MmvdDistance[ x0 ][ y0 ] | |
|---|---|---|
| [ x0 ][ y0 ] | ph_mmvd_fullpel_only_flag == 0 | ph_mmvd_fullpel_only_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

Herein, ph_mmvd_fullpel_only_flag may indicate whether the motion vector uses integer pixel precision in the merge mode of the current block. For example, when ph_mmvd_fullpel_only_flag is a first value, the merge mode of the current block uses integer pixel precision. That is, this may mean that the motion vector resolution of the current block is an integer pel. On the other hand, when ph_mmvd_fullpel_only_flag is a second value, the merge mode of the current block may use fractional pixel precision. In other words, when ph_mmvd_fullpel_only_flag is the second value, the merge mode of the current block may use integer pixel precision or fractional pixel precision. Alternatively, when ph_mmvd_fullpel_only_flag is the second value, the merge mode of the current block may be limited to use only fractional pixel precision. Examples of the fractional pixel precision include ½ pel, ¼ pel, and ⅛ pel.

In addition, MmvdSign may denote a direction of MMVD, and the direction may include at least one of left, right, top, bottom, top left, bottom left, top right, and bottom right directions. For example, MmvdSign may be determined as shown in Table 2 below.

TABLE 2

| mmvd_direction_idx [ x0 ][ y0 ] | MmvdSign [ x0 ][ y0 ][0] | MmvdSign [ x0 ][ y0 ][1] |
|---|---|---|
| 0 | +1 | 0 |
| 1 | −1 | 0 |
| 2 | 0 | +1 |
| 3 | 0 | −1 |

In Table 2, MmvdSign[x0][y0][0] may denote a sign of the x component of the MVD, and MmvdSign[x0][y0][1] may denote a sign of the y component of the MVD. When mmvd_direction_idx is 0, the MVD direction may be determined as a right direction. When mmvd_direction_idx is 1, the MVD direction may be determined as a left direction. When mmvd_direction_idx is 2, the MVD direction may be determined as bottom direction. When mmvd_direction_idx is 3, the MVD direction may be determined as a top direction.

The aforementioned mmvd_distance_idx and mmvd_direction_idx may be encoded/decoded only when mmvd_merge_flag is 1.

Meanwhile, the MVD may be set to be the same as the previously determined MmvdOffset. Alternatively, MmvdOffset may be corrected in consideration of a POC difference (PocDiff) between the reference picture of the current block and the current picture to which the current block belongs, and the corrected MmvdOffset may be set as the MVD. In this case, the current block is encoded/decoded through bi-directional prediction, and the reference picture of the current block may include a first reference picture (a reference picture in the L0 direction) and a second reference picture (a reference picture in the L1 direction). For convenience of explanation, hereinafter, the POC difference between the first reference picture and the current picture is called PocDiff0, and the POC difference between the second reference picture and the current picture is called PocDiff1. The MVD in the L0 direction is called MVD0, and the MVD in the L1 direction is called MVD1.

When the PocDiff0 and the PocDiff1 are identical, each of the MVD0 and MVD1 of the current block may be equally set to MmvdOffset.

In a case where the PocDiff0 and the PocDiff1 are not identical, when an absolute value of the PocDiff0 is greater than or equal to an absolute value of the PocDiff1, the MVD0 may be set equal to MmvdOffset. Meanwhile, the MVD1 may be derived based on a pre-set MVD0. For example, when the first and second reference pictures are long-term reference pictures, the MVD1 may be derived by applying a first scaling factor to the MVD0. The first scaling factor may be determined based on PocDiff0 and PocDiff1. On the other hand, when at least one of the first and second reference pictures is a short-term reference picture, the MVD1 may be derived by applying a second scaling factor to the MVD0. The second scaling factor may be a fixed value (e.g., −½, −1, etc.) pre-agreed in the encoding/decoding apparatus. However, the second scaling factor may be applied only when a sign of PocDiff0 and a sign of PocDiff1 are different from each other. When the sign of PocDiff0 and the sign of PocDiff1 are identical to each other, the MVD1 is set equal to the MVD0, and additional scaling may not be performed.

Meanwhile, in a case where the PocDiff0 and the PocDiff1 are not identical, when an absolute value of the PocDiff0 is less than an absolute value of the PocDiff1, the MVD1 may be set equal to MmvdOffset. Meanwhile, the MVD0 may be derived based on a pre-set MVD1. For example, when the first and second reference pictures are long-term reference pictures, the MVD0 may be derived by applying a first scaling factor to the MVD1. The first scaling factor may be determined based on PocDiff0 and PocDiff1. On the other hand, when at least one of the first and second reference pictures is a short-term reference picture, the MVD0 may be derived by applying a second scaling factor to the MVD1. The second scaling factor may be a fixed value (e.g., −½, −1, etc.) pre-agreed in the encoding/decoding apparatus. However, the second scaling factor may be applied only when a sign of PocDiff0 and a sign of PocDiff1 are different from each other. When the sign of PocDiff0 and the sign of PocDiff1 are identical to each other, the MVD0 is set equal to the MVD1, and additional scaling may not be performed.

Referring to FIG. 4, a prediction block of the current block may be obtained based on derived motion information (S420).

The prediction block may include prediction samples (prediction sample array) of the current block. When the motion vector of the current block indicates a fractional sample unit, an interpolation procedure may be performed, so that prediction samples of the current block may be derived based on reference samples in the fractional sample unit within a reference picture. When affine inter prediction is applied to the current block, the prediction block may be obtained based on a motion vector in a sample unit or a sub-block unit.

The obtained prediction block may include at least one of a block obtained through L0 prediction (hereinafter, referred to as L0 prediction block) and a block obtained through L1 prediction (hereinafter, referred to as L1 prediction block). The L0 prediction may mean prediction using a reference picture of a reference picture list 0 (List0) and a motion vector (mvL0) of the L0 direction. The L1 prediction may mean prediction using a reference picture of a reference picture list1 (List1) and a motion vector (mvL1) of the L1 direction.

For example, when the current block performs the uni-prediction, only any one of the L0 prediction block and the L1 prediction block may be obtained for the current block. In particular, when the current block performs only the L0 prediction (i.e., predFlagL0=1, predFlagL1=0), only the L0 prediction block may be obtained for the current block. On the other hand, when the current block performs the L1 prediction (i.e., predFlagL0=0, predFlagL1=1), only the L1 prediction block may be obtained for the current block. The obtained L0 or L1 prediction block may be used as the prediction block of the current block, or weighted prediction may be applied to the obtained L0 or L1 prediction block to obtain the prediction block of the current block.

Meanwhile, when the current block performs the bi-prediction, each of the L0 prediction block and the L1 prediction block may be obtained for the current block, and the prediction block of the current block may be obtained through the weighted prediction of the L0 prediction block and the L1 prediction block.

The weighted prediction according to the present disclosure may be roughly divided into an explicit weighted prediction and a default weighted prediction. Any one of the explicit weighted prediction and the default weighted prediction may be selectively used, and for this, a specific flag (weightedPredFlag) may be used. If a slice type of a slice to which the current block belongs is a P slice, a value of weightedPredFlag may be set to a value of a flag (pps_weighted_pred_flag) specifying whether the explicit weighted prediction is applied to the P slice. If the slice type of the slice to which the current block belongs of the B slice, the value of weightedPredFlag may be set to a value of a flag (pps_weighted_pred_flag) specifying whether the explicit weighted prediction is applied to the B slice. If the value of weightedPredFlag is 1, the explicit weighted prediction may be applied, and if the value of weightedPredFlag is 0, the default weighted prediction may be applied. Herein, the explicit and default weighted predictions will be described in detail.

1. Explicit Weighted Prediction

The explicit weighted prediction may imply that L0 and L1 prediction blocks of the current block are subjected to the weighted prediction based on weighted prediction information signaled explicitly. An explicit weighted prediction method using the weighted prediction information will be described in detail with reference to FIG. 8.

2. Default Weighted Prediction

The default weighted prediction may imply that L0/L1 prediction blocks are subjected to the weighted prediction based on a weight candidate pre-defined in the decoding apparatus. The default weighted prediction may be performed as shown in Equations 2 to 5, based on predFlagL0 and predFlagL1 of the current block.

(CASE 1) When predFlagL0=1 and predFlagL1=0

This is a case where the current block performs only the L0 prediction, and only the L0 prediction block may be obtained for the current block. In this case, the prediction block of the current block may be obtained by applying a specific offset (offset1) to the L0 prediction block obtained in advance. Herein, the offset may be determined variably based on a bit depth of a coded image. For example, the prediction block of the current block may be obtained through a weighted prediction as shown in Equation 2 below.

$$pbSamples[x][y]=Clip3(0,(1<<bitDepth)-1,(predSamplesL0[x][y]+offset1)>>shift1) \quad \text{[Equation 2]}$$

In Equation 2, pbSamples[x][y] may denote the prediction block of the current block, and predSamplesL0[x][y] may denote the L0 prediction block obtained through L0 prediction. offset1 may be set equal to $(1<<(shift1-1))$, and shift1 may be set equal to Max(2, 14−bitDepth). A variable bitDepth may denote a bit depth of a coded image, and may be determined based on coded information to specify a bit depth of a luma/chroma sample. The information may be signaled at a higher level, that is, at least one of a video parameter set, a sequence parameter set, a picture parameter set, a picture header, and a slice header.

(CASE 2) When predFlagL0=0 and predFlagL1=1

This is a case where the current block performs only the L1 prediction, and only the L1 prediction block may be obtained for the current block. In this case, the prediction block of the current block may be obtained by applying a specific offset (offset1) to the L01prediction block obtained in advance. For example, the prediction block of the current block may be obtained through a weighted prediction as shown in Equation 3 below.

$$pbSamples[x][y]=Clip3(0,(1<<bitDepth)-1,(predSamplesL1[x][y]+offset1)>>shift1) \quad \text{[Equation 3]}$$

In Equation 3, pbSamples[x][y] may denote the prediction block of the current block, and predSamplesL1[x][y] may denote the L1 prediction block obtained through L1 prediction. offset1 and shift1 are the same as described in CASE 1, and detailed descriptions thereof will be omitted.

(CASE 3) When predFlagL0=1 and predFlagL1=1

This is a case where the current block performs both the L0 prediction and the L1 prediction, and the L0 and L1 prediction blocks may be obtained for the current block. In this case, the prediction block of the current block may be obtained by applying a specific weight or offset to the L0 and L1 prediction blocks obtained in advance. The weight and the offset may be determined based on at least one of a weight candidate, a weight index (bcwIdx), and whether it is a block coded in a CIIP mode.

For example, when a value of the weighted index is 0, the prediction block of the current block may be obtained through a weighted prediction as shown in Equation 4 below.

$$pbSamples[x][y]=Clip3(0,(1<<bitDepth)-1,(predSamplesL0[x][y]+predSamplesL1[x][y]+offset2)>>shift2) \quad \text{[Equation 4]}$$

In Equation 4, pbSamples[x][y] may denote the prediction block of the current block, and predSamplesL0[x][y] and predSamplesL1[x][y] may respectively denote L0 and L1 prediction blocks obtained through L0 and L1 predictions. The same weight is applied to each of the L0 and L1 prediction blocks, which means that the prediction block of the current block is obtained by averaging the L0 and L1 prediction blocks. An offset (offset1) for weighted prediction may be set to equal to $(1<<(shift2-1))$, where a variable shift2 may be set equal to Max(3, 15−bitDepth). Meanwhile, even if the current block is a block coded in the CIIP mode, the same weighted prediction as shown in Equation 4 above may be equally applied.

Otherwise, when the value of the weighted index is not 0, the prediction block of the current block may be obtained through the weighted prediction as shown in Equation 5 below.

$$pbSamples[x][y]=Clip3(0,(1<<bitDepth)-1,(w0*predSamplesL0[x][y]+w1*predSamplesL1[x][y]+offset3)>>(shift1+3)) \quad \text{[Equation 5]}$$

In Equation 5, pbSamples[x][y], predSamplesL0 [x] [y], and predSamplesL1 [x][y] are the same as described above, and w0 and w1 denote weights applied respectively to the L0 prediction block and the L1 prediction block. An offset (offset3) for weighted prediction may be set equal to $(1<<(shift1+2))$, where a variable shift1 may be set equal to Max(2, 14−bitDepth).

The weight {w0, w1} of Equation 5 may be determined based on a weight candidate and weight index (bcwIdx)

pre-defined in the decoding apparatus. The weight candidate may include at least one of {4, 4}, {3, 5}, {5, 3}, {-2, 10}, and {10, -2}. Each weight candidate has a unique index, and a weight candidate having the same index as the weight index (bcwIdx) may be set as a weight for default weighted prediction.

The weight index (bcwIdx) may be information for specifying any one of a plurality of weight candidates. In case of the merge mode, the weight index may be derived from a merge candidate specified by the merge index. In case of the AMVP mode, the weight index may be encoded and signaled in the encoding apparatus. However, the weight index may be signaled limitedly based on at least one of an inter prediction indicator (inter_pred_idc), a flag (luma_weight_1X_flag, chroma_weight_1X_flag, X=0, 1) indicating a presence/absence of a weight in the L0/L1 direction, which will be described later, and a size of the current block.

For example, the weight index may be signaled only when the current block uses the bi-prediction according to the inter prediction indicator (inter_pred_idc). The weight index may be signaled only when a weight corresponding to the reference picture does not exist according to a flag indicating a presence/absence of the weight in the L0/L1 direction. The weight index may be signaled only when the size of the current block is greater than or equal to a specific threshold. Herein, the size of the current block may be expressed by a width and height of the current block, a product of the width and height, or a minimum (or maximum) value of the width and height, and the threshold may be 16, 32, 64, 128 or 256.

Figure 8:
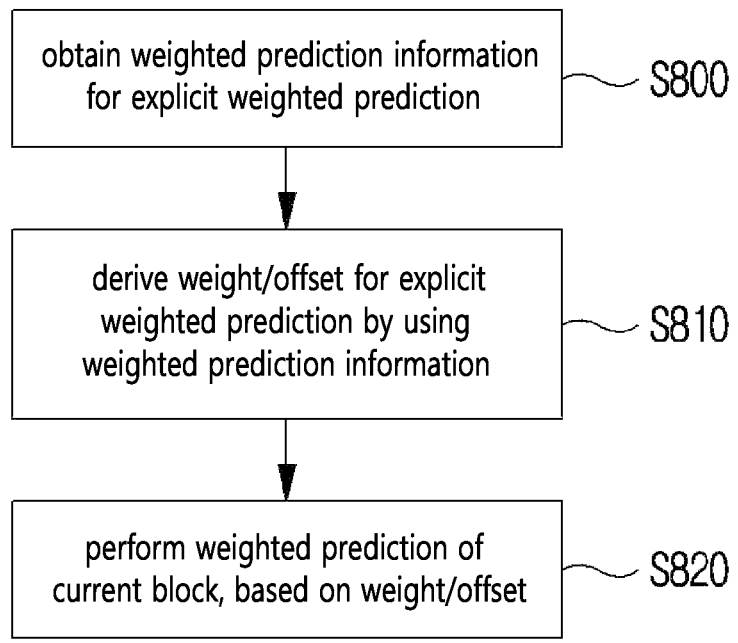
FIG. 8 illustrates an explicit weighted prediction method in a decoding apparatus according to the present disclosure.

FIG. 8 illustrates an explicit weighted prediction method in a decoding apparatus according to the present disclosure.

Referring to FIG. 8, weighted prediction information for the explicit weighted prediction may be obtained (S800).

The weighted prediction information may include at least one of weight common information, weight number information, a flag indicating whether a weight is present, weight delta information, or offset information.

TABLE 3

| | Descriptor |
|---|---|
| pred_weight_table( ) { | |
| luma_log2_weight_denom | ue(v) |
| if( ChromaArrayType != 0 ) | |
| delta_chroma_log2_weight_denom | se(v) |
| if( wp_info_in_ph_flag) | |
| num_l0_weights | ue(v) |
| for( i = 0; i < NumWeightsL0; i++ ) | |
| luma_weight_l0_flag[ i ] | u(1) |
| if( ChromaArrayType != 0 ) | |
| for( i = 0; i < NumWeightsL0; i++ ) | |
| chroma_weight_l0_flag[ i ] | u(1) |
| for( i = 0; i < NumWeightsL0; i++ ) { | |
| if( luma_weight_l0_flag[ i ] ) { | |
| delta_luma_weight_l0[ i ] | se(v) |
| luma_offset_l0[ i ] | se(v) |
| } | |
| if( chroma_weight_l0_flag[ i ] ) | |
| for( j = 0; j < 2; j++ ) { | |
| delta_chroma_weight_l0[ i ][ j ] | se(v) |
| delta_chroma_offset_l0[ i ][ j ] | se(v) |
| } | |
| } | |
| if( wp_info_in_ph_flag && pps_weighted_bipred_flag) | |
| num_l1_weights | ue(v) |
| for( i = 0; i < NumWeightsL1; i++ ) | |

TABLE 3-continued

| | Descriptor |
|---|---|
| luma_weight_l1_flag[ i ] | u(1) |
| if( ChromaArrayType != 0 ) | |
| for( i = 0; i < NumWeightsL1; i++ ) | |
| chroma_weight_l1_flag[ i ] | u(1) |
| for( i = 0; i < NumWeightsL1; i++ ) { | |
| if( luma_weight_l1_flag[ i ] ) { | |
| delta_luma_weight_l1[ i ] | se(v) |
| luma_offset_l1[ i ] | se(v) |
| } | |
| if( chroma_weight_l1_flag[ i ] ) | |
| for( j = 0; j < 2; j++ ) { | |
| delta_chroma_weight_l1[ i ][ j ] | se(v) |
| delta_chroma_offset_l1[ i ][ j ] | se(v) |
| } | |
| } | |
| } | |

Referring to Table 3, the weight common information may be signaled first in the encoding apparatus. The weight common information may specify a weight reference value commonly used when a weight is derived for the explicit weighted prediction. The weight common information may be commonly used to derive a weight w0 in the L0 direction and a weight w1 in the L1 direction. The weight common information may be signaled for each of a luma component and a chroma component (luma_log2_weight_denom, delta_chroma_log2_weight_denom). Herein, the weighted common information of the chroma component may be encoded by using a difference between a weight reference value of the luma component and a weight reference value of the chroma component.

Weighted prediction information except for the weighted common information may be signaled in each of the L0 direction and the L1 direction. Herein, the weighted prediction information in the L0 direction may be for reference pictures of a reference picture list for a P slice (or an L0 reference picture list), and the weighted prediction information in the L1 direction may be for reference pictures of a reference picture list for a B slice (or an L1 reference picture list).

First, regarding the weight predicted information in the L0 direction, weight number information (num_l0_weights) specifying the number of weights signaled in the L0 direction may be signaled. However, the weight number information may be adaptively signaled based on a flag (wp_info_in_ph_flag, hereinafter, referred to as a first flag) which specifies a position at which the weighted prediction information is signaled. Herein, the first flag may specify whether the weighted prediction information is present in a picture header or is present in a slice header. For example, when a value of the first flag is 1, it may indicate that the weighted prediction information may be present in the picture header but is not present in the slice header. On the other hand, when the value of the first flag is 0, it may indicate that the weighted prediction information is not present in the picture header but may be present in the slice header.

The flag indicating whether the weight in the L0 direction is present is signaled by the number based on the weight number information, and may be signaled in each of the luma component and the chroma component (luma_weight_l0_flag, chroma_weight_l0_flag, hereinafter, referred to as a second flag).

Based on the second flag, weight delta information and offset information in the L0 direction may be adaptively signaled. Herein, the weight delta information may specify a difference between a weight for explicit weighted prediction and the aforementioned weight reference value. When a value of the second flag is 1, the weight delta information and offset information in the L0 direction may be signaled, and when the value of the second flag is 0, the weight delta information and offset information in the L0 direction may not be signaled and may be derived to be 0. When the second flag is 1, the value of the weight delta information in the L0 direction shall be in the range of −128 to 127. The aforementioned weight delta information and offset information may be signaled for each of the luma component and the chroma component.

Next, regarding the weight predicted information in the L1 direction, weight number information (num_l1_weights) specifying the number of weights signaled in the L0 direction may be signaled. However, the weight number information may be adaptively signaled based on at least one of a flag (wp_info_in_ph_flag) which specifies a position at which the weighted prediction information is signaled or a flag (pps_weighted_bipred_flag) indicating whether the explicit weighted prediction is applied to a B slice. Herein, when a value of pps_weighted_bipred_flag is 1, it may indicate that the explicit weighted prediction is applied. When the value of pps_weighted_bipred_flag is 0, it may indicate that the explicit weighted prediction is not applied. Instead, the default weighted prediction may be applied.

For example, when the weighted prediction information is signaled in the picture header (i.e., wp_info_in_ph_flag=1) and the explicit weighted prediction is applied to the B slice (i.e., pps_weighted_bipred_flag=1), the weight number information may be signaled. On the other hand, when the weighted prediction information is signaled in the picture header but the explicit weighted prediction is not applied to the B slice (i.e., pps_weighted_bipred_flag=0), the weight number information may not be signaled but may be derived to be 0.

Alternatively, the weight number information may be adaptively signaled by considering only flag (wp_info_in_ph_flag) which specifies a position at which the weighted prediction information is signaled, regardless of a flag (pps_weighted_bipred_flag) indicating whether the explicit weighted prediction is applied to the B slice. However, according to the pps_weighted_bipred_flag, when the explicit weighted prediction is not applied to the B slice, the weight number information may be forced to be always 0.

In addition, the weight number information may also be signaled by further considering the number of reference pictures belonging to the L1 reference picture list. For example, the weight number information may be signaled only for a case where the number of reference pictures belonging to the L1 reference picture list is greater than a specific threshold number. Herein, the threshold number is a value pre-defined in the decoding apparatus, and may be 0, 1, or 2. However, the disclosure is not limited thereto, and the threshold number may be an integer greater than 2.

As described above, when the pps_weighted_bipred_flag is not considered in the signaling of the weight number information in the L1 direction, although it is a case where the explicit weighted prediction is applied only to the P slice, the encoding apparatus encodes the weighted prediction information in the L1 direction. For example, even when the explicit weighted prediction is not applied to the B slice (that is, pps_weighted_bipred_flag=0), there may be a case where the encoding apparatus encodes the weight number information (num_l1_weights) into a value greater than 0. However, when the explicit weighted prediction is not applied to the B slice, this means that the weighted prediction information in the L1 direction is not necessarily signaled. Therefore, encoding redundancy may be removed by omitting encoding of the weighted prediction information in the L1 direction. In addition, when the explicit weighted prediction is not applied to the B slice, this means that the weighted prediction information in the L1 direction is not required for the weighted prediction of the current block. Accordingly, decoding efficiency may be improved by adaptively decoding the weighted prediction information in the L1 direction in consideration of the pps_weighted_bipred_flag.

The flag indicating whether the weight in the L1 direction is present is signaled by the number based on the weight number information, and may be signaled in each of the luma component and the chroma component (luma_weight_l1_flag, chroma_weight_l1_flag, referred to as a third flag).

Based on the third flag, weight delta information and offset information in the L1 direction may be adaptively signaled. Herein, the weight delta information may specify a difference between a weight for explicit weighted prediction and the aforementioned weight reference value. When a value of the third flag is 1, the weight delta information and offset information in the L1 direction may be signaled, and when the value of the third flag is 0, the weight delta information and offset information in the L1 direction may not be signaled and may be derived to be 0. When the third flag is 1, the value of the weight delta information in the L1 direction shall be in the range of −128 to 127. The aforementioned weight delta information and offset information may be signaled for each of the luma component and the chroma component.

Referring to FIG. 8, at least one of the weight or offset for the explicit weighted prediction of the current block may be derived by using the aforementioned weighted prediction information (S810).

For example, when at least one of the following conditions is satisfied, the weight and/or offset for the weighted prediction of the current block may be derived by using at least one of weighted prediction information signaled in the L0 direction.

(Condition 1) The weighted prediction information is present in the picture header, the explicit weighted prediction is applied to the P slice, and a slice type of a current slice to which the current block belongs is the P slice.

(Condition 2) The weighted prediction information is present in the picture header, the explicit weighted prediction is applied to the B slice, and the slice type of the current slice to which the current block belongs is the B slice.

Alternatively, when at least one of the following conditions is satisfied, the weight and/or offset for the weighted prediction of the current block may be derived by using at least one of the weighted prediction information signaled in the L0 direction. That is, when the weighted prediction information in the L0 direction is used, whether the weighted prediction information is present in the picture header may not be considered according to the wp_info_in_ph_flag.

(Condition 1) The explicit weighted prediction is applied to the P slice, and the slice type of the current slice to which the current block belongs is the P slice.

(Condition 2) The explicit weighted prediction is applied to the B slice, and the slice type of the current slice to which the current block belongs is the B slice.

For example, when the weighted prediction information is present in the picture header, the explicit weighted prediction is applied to the B slice, and the slice type of the current slice to which the current block belongs is the B slice, the weight and/or offset for the weighted prediction of the current block may be derived by using at least one of the weighted prediction information signaled in the L1 direction.

Alternatively, when the explicit weighted prediction is applied to the B slice and the slice type of the current slice to which the current block belongs is the B slice, the weight and/or offset for the weighted prediction of the current block may be derived by using at least one of the weighted prediction information signaled in the L1 direction. That is, when the weighted prediction information in the L1 direction is used, whether the weighted prediction information is present in the picture header may not be considered according to the wp_info_in_ph_flag.

The weight and the offset are derived for each of the luma component and the chroma component. Hereinafter, a method of deriving the weight and the offset for each component will be described in detail.

First, the weight of the luma component is derived by using weight common information and weight delta information, and may be derived for example as shown in Equation 6 below.

$$w0=\text{LumaWeightL0[refIdxL0]}$$

$$w1=\text{LumaWeightL1[refIdxL1]} \qquad [\text{Equation 6}]$$

In Equation 6, w0 may denote a weight in the L0 direction, and w1 may denote a weight in the L1 direction. LumaWeightL0[i] may be derived as ((1<<luma_log_2_weight_denom)+delta_luma_weight_10[i]), and LumaWeightL1[i] may be derived as ((1<<luma_log_2_weight_denom)+delta_luma_weight_11[i]). refIdxL0 and refIdxL1 may respectively denote a reference picture index in the L0 direction of the current block and a reference picture index in the L1 direction. That is, the weight in the L0 direction may be derived by using weight common information and weight delta information corresponding to the reference picture index (refIdxL0) in the L0 direction of the current block. Similarly, the weight in the L1 direction may be derived by using weight common information and weight delta information corresponding to the reference picture index (refIdxL1) in the L1-direction of the current block.

However, when a value of a flag indicating whether the weight in the L0 direction is present is 0, the weight in the L0 direction may be derived by using only the weight common information, and the weight in the L0 direction may be derived as 2_luma_log_2_weight_denom. Similarly, when the value of the flag indicating whether the weight in the L1 direction is present is 0, the weight in the L1 direction may be derived by using only the weight common information, and the weight in the L1 direction may be derived as 2_luma_log_2_weight_denom.

An offset of the luma component is derived by using offset information, and may be derived for example as shown in Equation 7 below.

$$o0=\text{luma\_offset\_10[refIdxL0]}<<(\text{bitDepth}-8)$$

$$o1=\text{luma\_offset\_11[refIdxL1]}<<(\text{bitDepth}-8) \qquad [\text{Equation 7}]$$

In Equation 7, o0 may denote an offset in the L0 direction, and o1 may denote an offset in the L1 direction. luma_offset_10 and luma_offset_11 correspond to offset information, and in particular, may denote offset information corresponding to reference picture indices refIdxL0 and refIdxL1 of the current block among the offset information signaled by the number depending on the weight number information.

The weight of the chroma component is derived by using the weight common information and the weight delta information, and may be derived for example as shown in Equation 8 below.

$$w0=\text{ChromaWeightL0[refIdxL0]}$$

$$w1=\text{ChromaWeightL1[refIdxL1]} \qquad [\text{Equation 8}]$$

In Equation 8, w0 may denote a weight in the L0 direction, and w1 may denote a weight in the L1 direction. ChromaWeightL0[i] may be derived as ((1<<ChromaLog2WeightDenom)+delta_chroma_weight_10[i]), and ChromaWeightL1[i] may be derived as ((1<<ChromaLog2WeightDenom)+delta_chroma_weight_11[i]). Herein, a variable ChromaLog2WeightDenom may be derived as a sum of the aforementioned weighted common information signaled for each of the luma component and the chroma component (i.e., luma_log_2_weight_denom+delta_chroma_log_2_weight_denom). refIdxL0 and refIdxL1 may respectively denote a reference picture index in the L0 direction of the current block and a reference picture index in the L1 direction. That is, the weight in the L0 direction may be derived by using weight common information signaled for the luma/chroma component and weight delta information corresponding to the reference picture index (refIdxL0) in the L0 direction of the current block. Similarly, the weight in the L1 direction may be derived by using weight common information signaled for the luma/chroma component and weight delta information corresponding to the reference picture index (refIdxL1) in the L1-direction of the current block.

However, when a value of a flag indicating whether the weight in the L0 direction is present is 0, the weight in the L0 direction may be derived by using only the weight common information, and the weight in the L0 direction may be derived as $2^{ChromaLog2WeightDenom}$. Similarly, when the value of the flag indicating whether the weight in the L1 direction is present is 0, the weight in the L1 direction may be derived by using only the weight common information, and the weight in the L1 direction may be derived as $2^{ChromaLog2WeightDenom}$.

An offset of the chroma component is derived by using offset information, and may be derived for example as shown in Equations 9 and 10 below.

$$o0=\text{ChromaOffsetL0[refIdxL0]}<<(\text{bitDepth}-8)$$

$$o1=\text{ChromaOffsetL1[refIdxL1]}<<(\text{bitDepth}-8) \qquad [\text{Equation 9}]$$

In Equation 9, o0 may denote an offset in the L0 direction, and o1 may denote an offset in the L1 direction. refIdxL0 and refIdxL1 may respectively denote a reference picture index in the L0 direction of the current block and a reference picture index in the L1 direction. Herein, variables ChromaOffsetL0 and ChromaOffsetL1 may be derived based on at least one of offset information of the chroma component, a pre-derived weight, and the variable ChromaLog2WeightDenom, and may be derived for example as shown in Equation 10 below.

$$\text{ChromaOffsetL0}[i]=\text{Clip3}(-128,127,(128+\text{delta\_chroma\_offset\_10}[i]-((128*\text{ChromaWeightL0}[i])>>\text{ChromaLog2WeightDenom})))$$

$$\text{ChromaOffsetL1}[i]=\text{Clip3}(-128,127,(128+\text{delta\_chroma\_offset\_11}[i]-((128*\text{ChromaWeightL1}[i])>>\text{ChromaLog2WeightDenom}))) \qquad [\text{Equation 10}]$$

Referring to FIG. 8, the weighted prediction of the current block may be performed based on the derived weight and offset (S820).

Specifically, the explicit weighted prediction may be performed by considering whether the current block performs the L0 prediction (predFlagL0) and whether the current block performs the L1 prediction (predFlagL1).

(CASE 1) When predFlagL0=1 and predFlagL1=0

This is a case where the current block performs only the L0 prediction, and only the L0 prediction block may be obtained for the current block. In this case, the prediction block of the current block may be obtained as shown in Equation 11 below, by applying a specific weight and offset to the L0 prediction block obtained in advance.

$$pbSamples[x][y]=Clip3(0,(1<<bitDepth)-1,((predSamplesL0[x][y]*w0+2^{log2Wd-1})>>log2Wd)+o0) \quad \text{[Equation 11]}$$

In Equation 11, pbSamples may denote the prediction block of the current block, that is, the prediction block subjected to the weighted prediction, and predSamplesL0 may denote the L0 prediction block of the current block. Herein, a variable log2Wd may be derived as (luma_log2_weight_denom+shift1), and a variable shift1 may be derived a Max(2, 14−bitDepth).

(CASE 2) When predFlagL0=0 and predFlagL1=1

This is a case where the current block performs only the L1 prediction, and only the L1 prediction block may be obtained for the current block. In this case, the prediction block of the current block may be obtained as shown in Equation 12 below, by applying a specific weight and offset to the L1 prediction block obtained in advance.

$$pbSamples[x][y]=Clip3(0,(1<<bitDepth)-1,((predSamplesL1[x][y]*w0+2^{log2Wd-1})>>log2Wd)+o0) \quad \text{[Equation 12]}$$

In Equation 12, predSamplesL1 may denote the L1 prediction block of the current block. Meanwhile, pbSamples and a variable log2Wd are the same as described in Equation 11, and redundant descriptions thereof will be omitted.

(CASE 3) When predFlagL0=1 and predFlagL1=1

This is a case where the current block performs the L0 prediction and the L1 prediction, and the L0 prediction block and the L1 prediction block may be obtained for the current block. In this case, the prediction block of the current block may be obtained as shown in Equation 13 below, by applying a specific weight and offset to the L1 prediction block obtained in advance.

$$pbSamples[x][y]=Clip3(0,(1<<bitDepth)-1,(predSamplesL0[x][y]*w0+predSamplesL1[x][y]*w1+((o0+o1+1)<<log2Wd))>>(log2Wd+1)) \quad \text{[Equation 13]}$$

In Equation 13, predSamples, predSamplesL0, predSamplesL1, and a variable log2Wd are the same as described in Equations 11 and 12, and redundant descriptions thereof will be omitted.

Figure 9:
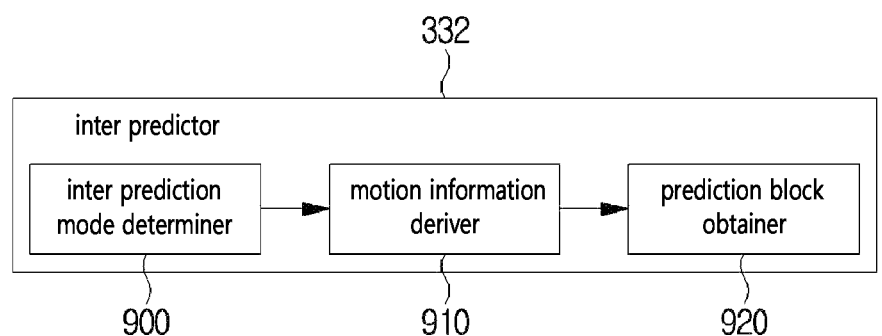
FIG. 9 schematically illustrates a structure of an inter predictor 332 in a decoding apparatus according to the present disclosure.

FIG. 9 schematically illustrates a structure of the inter predictor 332 in the decoding apparatus according to the present disclosure.

Referring to FIG. 9, the inter predictor 332 may include an inter-prediction mode determiner 900, a motion information deriver 910, and a prediction block obtainer 920.

The inter-prediction mode determiner 900 may determine at least one of a plurality of inter-prediction modes predefined in the decoding apparatus as the inter-prediction mode of the current block. Herein, the plurality of inter-prediction modes may include various modes such as a skip mode, a merge mode, a motion vector prediction (MVP) mode, a subblock merge mode, an affine mode, a merge with MVD (MMVD) mode, a combined inter and intra prediction (CIIP) mode, or the like. The affine mode may be called an affine motion prediction mode. The MVP mode may be referred to as advanced motion vector prediction (AMVP) mode. In addition, a decoder side motion vector refinement (DMVR) mode, an adaptive motion vector resolution (AMVR) mode, a bi-directional flow (BDOF), or the like may also be used as additional modes additionally or alternatively.

The inter-prediction mode determiner 900 may determine the inter-prediction mode of the current block, based on the prediction mode information received from the encoding apparatus, which is the same as described above with reference to FIG. 4. Herein, redundant descriptions thereof will be omitted.

The motion information deriver 910 may derive motion information of the current block based on the determined inter-prediction mode. When the inter-prediction mode of the current block is determined as the merge mode, the motion information may be derived based on motion information of a merge candidate selected by selection information (e.g., merge index) in a merge candidate list, which is the same as described above with reference to FIG. 4. Herein, redundant descriptions thereof will be omitted.

The prediction block obtainer 920 may obtain a prediction block of the current block, based on the derived motion information.

The prediction block may include prediction samples (prediction sample array) of the current block. When the motion vector of the current block indicates a fractional sample unit, an interpolation procedure may be performed, so that prediction samples of the current block may be derived based on reference samples in the fractional sample unit within a reference picture. When affine inter prediction is applied to the current block, the prediction block may be obtained based on a motion vector in a sample unit or a sub-block unit.

In addition, the L0 prediction block obtained for the current block through the L0 prediction or the L1 prediction block obtained through the L1 prediction may be used as the prediction block. Alternatively, the prediction block may be obtained by applying the weighted prediction to at least one of the L0 prediction block and L1 prediction block of the current block. Herein, the weighted prediction is roughly divided into an explicit weighted prediction and a default weighted prediction, which is the same as described above with reference to FIG. 4, FIG. 8, and Table 3. Thus, redundant descriptions thereof will be omitted.

Figure 10:
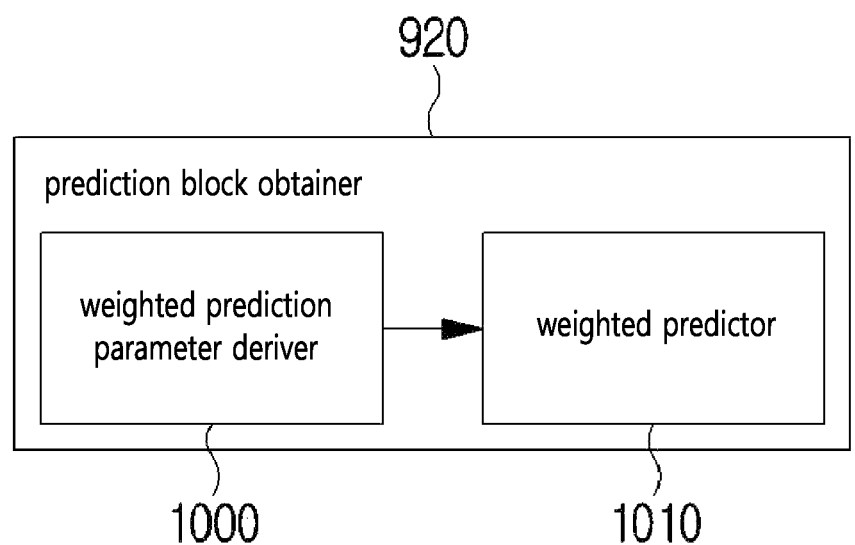
FIG. 10 schematically illustrates a structure of a prediction block obtainer 920 in an inter predictor 332 according to the present disclosure.

FIG. 10 schematically illustrates a structure of the prediction block obtainer 920 in the inter predictor 332 according to the present disclosure.

Referring to FIG. 10, the prediction block obtainer 920 may include a weighted prediction parameter deriver 1000 and a weighted predictor 1010.

The weighted prediction parameter deriver 1000 may derive a weighted prediction parameter for explicit weighted prediction of a current block by using weighted prediction information. Herein, the weighted prediction information may include at least one of the aforementioned weight or offset for the explicit weighted prediction.

The weighted prediction information may be obtained through entropy decoding in the entropy decoder 310 of the decoding apparatus, and may be transmitted to the weighted prediction parameter deriver 1000. The weighted prediction information is the same as described with reference to Table 2, and a method of deriving the weighted prediction parameter, based on the weighted prediction information, is the same as described with reference to FIG. 8.

The weighted predictor 1010 may perform weighted prediction on the current block, based on the weighted prediction parameter derived in the weighted prediction parameter deriver 1000. The weighted prediction is performed by considering whether the current block performs the L0 prediction (predFlagL0) and whether the current block performs the L1 prediction (predFlagL1), which is the same as described with reference to FIG. 8.

Figure 11:
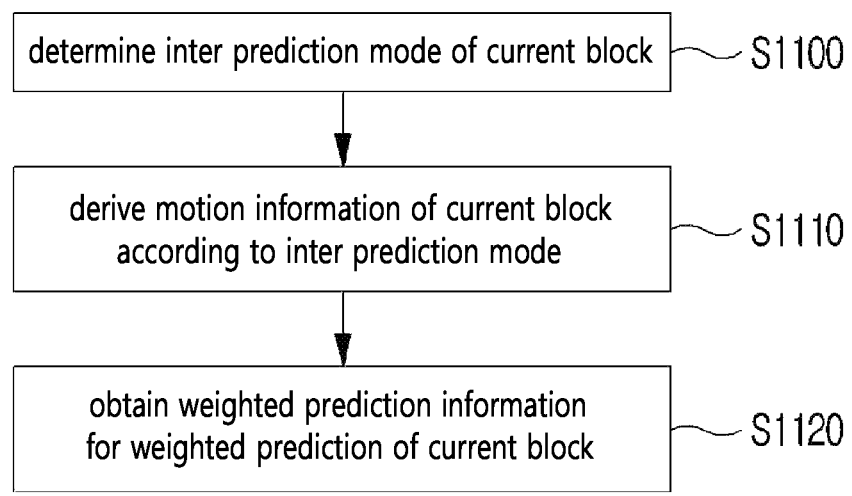
FIG. 11 illustrates an inter-prediction method in an encoding apparatus according to the present disclosure.

FIG. 11 illustrates an inter-prediction method in an encoding apparatus according to the present disclosure.

Referring to FIG. 11, an inter-prediction mode of a current block may be determined (S1100).

At least one of a plurality of inter-prediction modes pre-defined in the encoding apparatus may be determined as the inter-prediction mode of the current block. Herein, the plurality of inter-prediction modes may include various modes such as a skip mode, a merge mode, a motion vector prediction (MVP) mode, a subblock merge mode, an affine mode, a merge with MVD (MMVD) mode, a combined inter and intra prediction (CIIP) mode, or the like. In addition, a decoder side motion vector refinement (DMVR) mode, an adaptive motion vector resolution (AMVR) mode, a bi-directional flow (BDOF), or the like may also be used as additional modes additionally or alternatively.

The encoding apparatus may encode prediction mode information indicating the inter-prediction mode of the current block, and may signal the prediction mode information to the decoding apparatus. The prediction mode information may include index information indicating one of a plurality of candidate modes. Alternatively, the inter-prediction mode may be indicated through hierarchical signaling of flag information. In this case, the prediction mode information may include one or more flags. The prediction mode information related to the inter-prediction mode is the same as described in detail with reference to FIG. 4. Herein, detailed descriptions thereof will be omitted.

Referring to FIG. 11, motion information of the current block may be derived based on the determined inter-prediction mode (S1110).

The encoding apparatus may derive optimal motion information for the current block through motion estimation. The motion information may include at least one of a motion vector (mv), a reference picture index (refIdx), and a prediction direction flag (predFlagL0, predFlagL1), as described above with reference to FIG. 4. For example, the encoding apparatus may search for a similar reference block having a high correlation in units of fractional pixels within a predetermined search range in the reference picture by using the original block in the original picture for the current block, thereby deriving motion information.

Similarity of blocks may be derived based on a difference of phase based sample values. For example, the similarity of the blocks may be calculated based on the SAD between the current block (or template of the current block) and the reference block (or template of the reference block). In this case, motion information may be derived based on a reference block having the smallest SAD in the search area. The derived motion information may be signaled to the decoding apparatus according to various methods based on the pre-defined inter-prediction mode.

The encoding apparatus may search for a merge candidate block used to derive the motion information of the current block to perform the merge mode. For example, up to five merge candidate blocks may be used, but the embodiment(s) of the present specification is not limited thereto. In addition, the maximum number of the merge candidate blocks may be transmitted in at least one of a video parameter set, a sequence parameter set, a picture parameter set, a picture header, a slice header, and a tile group header, but the embodiment(s) of the present specification is not limited thereto.

After finding the merge candidate blocks, the encoder may generate a merge candidate list consisting of a plurality of merge candidates based on the found merge candidate blocks, and may select a merge candidate having the smallest cost among them as a final merge candidate for deriving the motion information of the current block. A merge index specifying the selected final merge candidate is encoded, and this may be signaled to the decoding apparatus.

The merge candidate list includes at least one of a spatial merge candidate, a temporal merge candidate, a history-based merge candidate, an average merge candidate, or a zero vector merge candidate. Since a method of generating the merge candidate list is the same as described above with reference to FIG. 4, detailed descriptions thereof will omitted herein.

The motion information of the selected merge candidate may be used as the motion information of the current block. Alternatively, a motion vector of the selected merge candidate may be corrected by using a motion vector difference (MVD) having a specific length and direction as shown in FIG. 7, and the motion vector corrected based on the MVD may be used as the motion vector of the current block.

The encoding apparatus may additionally search for a reference block, based on a pre-defined MVD length (MmvdDistance) as shown in Table 1 and a pre-defined MVD direction (MmvdSign) as shown in Table 2, and may select each of a length and direction of an MVD corresponding to an optimal reference block. The MVD may be derived based on the selected MVD length and direction. The selected MVD length and direction may be respectively encoded into mmvd_distance_idx and mmvd_direction_idx, based on Table 1 and Table 2 pre-defined in the encoding apparatus. This is the same as described in detail with reference to FIG. 4, and detailed descriptions thereof will be omitted herein.

Referring to FIG. 11, weighted prediction information for weighted prediction of a current block may be obtained (S1120).

The weighted prediction may be any one of the aforementioned explicit weighted prediction and default weighted prediction. The weighted prediction information may be obtained for at least one of the L0 prediction block and L1 prediction block of the current block. Herein, the L0/L1 prediction block may be obtained based on the motion information derived in S1110 described above.

The weighted prediction information may be obtained based on a specific weighted prediction coefficient (i.e., at least one of a specific weight or offset). A method of deriving the weight and the offset, based on the weighted prediction information, has been described above with reference to FIG. 8. The weighted prediction information may be obtained based on the weighted prediction coefficient through a reverse process of the method. Herein, the weighted prediction coefficient may be determined based on the L0/L1 prediction block of the current block, or may be determined based on the L0/L1 reference picture of the current block.

The weighted prediction information may include at least one of weight common information, weight number information, a flag indicating whether a weight is present, weight delta information, or offset information. The weighted prediction information may be encoded in the encoding apparatus and signaled to the decoding apparatus, and the weighted prediction information except for the weight common information may be coded for each of the L0 direction and the L1 direction.

Specifically, in case of the weighted prediction information in the L0 direction, the weight number information may be encoded when a value of a flag (wp_info_in_ph_flag) specifying a position at which the weighted prediction information is encoded is 1. The flag indicating whether a weight is present may be encoded by the number based on the weight number information. The weight delta information and the offset information may also be encoded by the number based on the weight number information, and may be encoded only when the value of the flag indicating whether the weight is present is 1.

In case of the weighted prediction information in the L1 direction, the weight number information may be encoded when a value of a flag (wp_info_in_ph_flag) specifying a position at which the weighted prediction information is encoded is 1. In addition, the weighted prediction information may be encoded when the value of the flag (pps_weighted_bipred_flag) indicating whether the explicit weighted prediction is applied to the B slice. However, the weighted prediction information may be limited to be encoded only when the number of reference pictures belonging to the L1 reference picture list is greater than a threshold number pre-defined in the encoding apparatus. Herein, the threshold number may be 0, 1, or 2. The flag indicating whether the weight is present may be encoded by the number based on the weight number information. The weight delta information and the offset information may also be encoded by the number based on the weight number information, and may be encoded only when the value of the flag indicating whether the weight is present is 1.

Meanwhile, the encoding apparatus may derive residual samples of the current block, based on prediction samples of the prediction block obtained based on the weighted prediction coefficient, and may signal residual information on the residual samples to the decoding apparatus.

Figure 12:
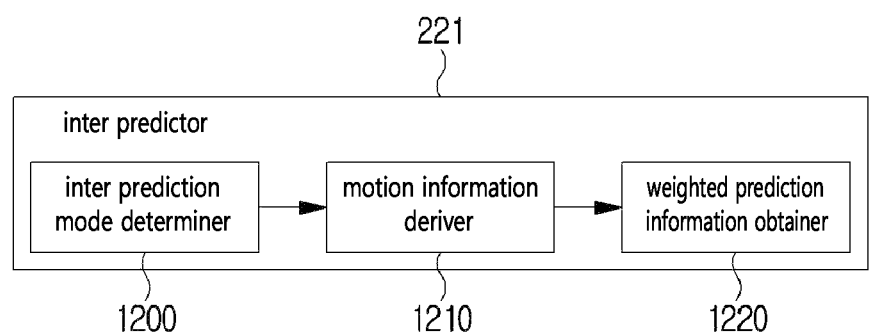
FIG. 12 schematically illustrates a structure of an inter predictor 221 in an encoding apparatus according to the present disclosure.

FIG. 12 schematically illustrates a structure of the inter predictor 221 in the encoding apparatus according to the present disclosure.

Referring to FIG. 12, the inter predictor 221 may include an inter-prediction mode determiner 1200, a motion information deriver 1210, and a weighted prediction coefficient determiner 1220.

The inter-prediction mode determiner 1200 may determine at least one of a plurality of inter-prediction modes pre-defined in the encoding apparatus as the inter-prediction mode of the current block. Herein, the plurality of inter-prediction modes may include various modes such as a skip mode, a merge mode, a motion vector prediction (MVP) mode, a subblock merge mode, an affine mode, a merge with MVD (MMVD) mode, a combined inter and intra prediction (CIIP) mode, or the like. In addition, a decoder side motion vector refinement (DMVR) mode, an adaptive motion vector resolution (AMVR) mode, a bi-directional flow (BDOF), or the like may also be used as additional modes additionally or alternatively.

Prediction mode information indicating the determined inter-prediction mode may be encoded through the entropy encoder 240, and may be signaled to the decoding apparatus. The prediction mode information may include index information indicating one of a plurality of candidate modes. Alternatively, the inter-prediction mode may be indicated through hierarchical signaling of flag information. In this case, the prediction mode information may include one or more flags. The prediction mode information related to the inter-prediction mode is the same as described in detail with reference to FIG. 4. Herein, detailed descriptions thereof will be omitted.

The motion information deriver 1210 may derive motion information of the current block, based on the determined inter-prediction mode The motion information deriver 1210 may derive optimal motion information for the current block through motion estimation. The motion information may include at least one of a motion vector (my), a reference picture index (refIdx), and a prediction direction flag (predFlagL0, predFlagL1), as described above with reference to FIG. 4. For example, the motion information deriver 1210 may search for a similar reference block having a high correlation in units of fractional pixels within a predetermined search range in the reference picture by using the original block in the original picture for the current block, thereby deriving motion information.

Similarity of blocks may be derived based on a difference of phase based sample values. For example, the similarity of the blocks may be calculated based on the SAD between the current block (or template of the current block) and the reference block (or template of the reference block). In this case, motion information may be derived based on a reference block having the smallest SAD in the search area. The derived motion information may be signaled to the decoding apparatus according to various methods based on the pre-defined inter-prediction mode.

The motion information deriver 1210 may search for a merge candidate block used to derive the motion information of the current block to perform the merge mode. For example, up to five merge candidate blocks may be used, but the embodiment(s) of the present specification is not limited thereto. In addition, the maximum number of the merge candidate blocks may be transmitted in at least one of a video parameter set, a sequence parameter set, a picture parameter set, a picture header, a slice header, and a tile group header, but the embodiment(s) of the present specification is not limited thereto.

After finding the merge candidate blocks, the motion information deriver 1210 may generate a merge candidate list consisting of a plurality of merge candidates based on the found merge candidate blocks, and may select a merge candidate having the smallest cost among them as a final merge candidate for deriving the motion information of the current block. A merge index specifying the selected final merge candidate may be encoded through the entropy encoder 240, and this may be signaled to the decoding apparatus.

The merge candidate list includes at least one of a spatial merge candidate, a temporal merge candidate, a history-based merge candidate, an average merge candidate, or a zero vector merge candidate. Since a method of generating the merge candidate list is the same as described above with reference to FIG. 4, detailed descriptions thereof will omitted herein.

The motion information deriver 1210 may derive motion information of the selected merge candidate as the motion information of the current block. Alternatively, the motion information deriver 1210 may correct a motion vector of the selected merge candidate by using a motion vector difference (MVD) having a specific length and direction, and may derive the corrected motion vector corrected as the motion vector of the current block.

For this, the motion information deriver 1210 may additionally search for a reference block, based on a pre-defined MVD length (MmvdDistance) as shown in Table 1 and a pre-defined MVD direction (MmvdSign) as shown in Table 2, and may select each of a length and direction of an MVD corresponding to an optimal reference block. The motion information deriver 1210 may derive the MVD, based on the selected MVD length and direction.

Meanwhile, the motion information deriver 1210 may derive mmvd_distance_idx and mmvd_direction_idx respectively from the length and direction of the selected MVD, which may be encoded in the entropy encoder 240. This is the same as described in detail with reference to FIG. 4, and detailed descriptions thereof will be omitted herein.

The weighted prediction information obtainer 1220 may obtain the weighted prediction information of the L0/L1 prediction block obtained in the motion information deriver 1210. Herein, the L0/L1 prediction block may be obtained based on the motion information derived in the motion information deriver 1210. The weighted prediction may be any one of the explicit weighted prediction and the default weighted prediction.

The weighted prediction information obtainer 1220 may obtain the weighted prediction information, based on a specific weighted prediction coefficient (i.e., at least one of a weight or an offset). A method of deriving the weight and the offset, based on the weighted prediction information, has been described above with reference to FIG. 8. The weighted prediction information may be obtained based on the weighted prediction coefficient through a reverse process of the method. Herein, the weighted prediction coefficient may be determined based on the L0/L1 prediction block of the current block, or may be determined based on the L0/L1 reference picture of the current block.

The weighted prediction information may include at least one of weight common information, weight number information, a flag indicating whether a weight is present, weight delta information, or offset information. The obtained weighted prediction information may be encoded through the entropy encoder 240, which is the same as described with reference to FIG. 11, and thus redundant descriptions thereof will be omitted.

Embodiments described in the present document may be embodied and performed on a processor, a microprocessor, a controller or a chip. For example, functional units shown in each drawing may be embodied and performed on a computer, a processor, a microprocessor, a controller or a chip. In this case, information (e.g., information on instructions) or algorithm for embodiment may be stored in a digital storage medium.

Further, the decoding apparatus and the encoding apparatus to which the embodiment(s) of the specification is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an internet streaming service providing device, a three-dimensional (3D) video device, a virtual reality (VR) apparatus, an augmented reality (AR) apparatus, a video telephony video device, a transportation means terminal (e.g., a vehicle terminal, an aircraft terminal, a ship terminal, etc.) and a medical video device, and may be used to process a video signal or a data signal. For example, the over the top (OTT) video device may include a game console, a Blu-ray player, an Internet access TV, a Home theater system, a smart phone, a Tablet PC, a digital video recorder (DVR) and the like.

In addition, the processing method to which the embodiment(s) of the specification is applied, may be produced in the form of a program executed by a computer, and be stored in a computer-readable recording medium. Multimedia data having a data structure according to the embodiment(s) of the specification may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network.

Additionally, the embodiments of the specification may be embodied as a computer program product by program codes, and the program codes may be executed on a computer by the embodiments of the specification. The program codes may be stored on a computer-readable carrier.

The content streaming system to which the embodiment(s) of this document is applied may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the specification is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

INDUSTRIAL APPLICABILITY

The present disclosure can be used to encode/decode video signals.

What is claimed is:

1. An image decoding method comprising:
   determining an inter-prediction mode of a current block;
   deriving motion information of the current block according to the determined inter-prediction mode; and
   obtaining a prediction block of the current block, based on the derived motion information,
   wherein the prediction block is obtained based on weighted prediction information for explicit weighted prediction of the current block,
   wherein the weighted prediction information includes weight number information,
   wherein the weight number information includes L0 weight number information specifying a number of weights signaled in an L0 direction and L1 weight number information specifying a number of weights signaled in an L1 direction,
   wherein the L0 weight number information is adaptively signaled based on a first flag specifying a position at which the weighted prediction information could be present while the L1 weight number information is adaptively signaled based on the first flag and a second flag indicating whether the explicit weighted prediction is applied to a bi-predictive (B) slice,
   wherein the first flag equal to 1 specifies that the weighted prediction information could be present in a picture header, and the first flag equal to 0 specifies that the weighted prediction information could be present in the slice header,
   wherein the second flag equal to 1 specifies that the explicit weighted prediction is applied to the B slice, and the second flag equal to 0 specifies that the explicit weighted prediction is not applied to the B slice, and
   wherein, based on the first flag and the second flag being equal to 1, the L1 weight number information is signaled from a bitstream.

2. The image decoding method of claim 1, wherein the motion information of the current block is derived based on a merge candidate list, and
   wherein the merge candidate list includes at least one of a spatial merge candidate, a temporal merge candidate, a history-based merge candidate, or an average merge candidate.

3. The image decoding method of claim 2, wherein deriving the motion information of the current block comprises modifying a motion vector among the derived motion information by using a motion vector difference (MVD), and
   wherein the MVD is derived based on at least one of a length of the MVD, a direction of the MVD, or a picture order count (POC) difference between a reference picture of the current block and a current picture including the current block.

4. The image decoding method of claim 1, wherein obtaining the prediction block of the current block comprises:
   obtaining the weighted prediction information for the explicit weighted prediction of the current block;
   deriving at least one of the weight or an offset for the explicit weighted prediction of the current block by using the weighted prediction information; and
   performing weighted prediction of the current block based on the at least one of the weight or the offset.

5. The image decoding method of claim 1, wherein, based on either the first flag or the second flag being equal to 0, the L1 weight number information is not signaled but is derived to be 0.

6. An image encoding method comprising:
   determining an inter-prediction mode of a current block;
   deriving motion information of the current block according to the determined inter-prediction mode; and
   obtaining weighted prediction information for explicit weighted prediction of the current block,
   wherein the weighted prediction information includes weight number information,
   wherein the weight number information includes L0 weight number information specifying a number of weights signaled in an L0 direction and L1 weight number information specifying a number of weights signaled in an L1 direction,
   wherein the L0 weight number information is adaptively encoded based on a first flag specifying a position at which the weighted prediction information could be present while the L1 weight number information is adaptively encoded based on the first flag and a second flag indicating whether the explicit weighted prediction is applied to a bi-predictive (B) slice,
   wherein the first flag equal to 1 specifies that the weighted prediction information could be present in a picture header, and the first flag equal to 0 specifies that the weighted prediction information could be present in the slice header,
   wherein the second flag equal to 1 specifies that the explicit weighted prediction is applied to the B slice, and the second flag equal to 0 specifies that the explicit weighted prediction is not applied to the B slice, and
   wherein, based on the first flag and the second flag being equal to 1, the L1 weight number information is encoded into a bitstream.

7. The image encoding method of claim 6, wherein the motion information of the current block is derived based on a merge candidate list, and
   wherein the merge candidate list includes at least one of a spatial merge candidate, a temporal merge candidate, a history-based merge candidate, or an average merge candidate.

8. The image encoding method of claim 7, wherein deriving the motion information of the current block comprises modifying a motion vector among the derived motion information by using a motion vector difference (MVD), and
   wherein the MVD is derived based on at least one of a length of the MVD, a direction of the MVD, or a picture order count (POC) difference between a reference picture of the current block and a current picture including the current block.

9. The image encoding method of claim 6, wherein obtaining the weighted prediction information for the explicit weighted prediction of the current block comprises:
   determining at least one of the weight or an offset for the explicit weighted prediction of the current block; and
   obtaining the weighted prediction information of the current block, based on the at least one of the weight or the offset.

10. The image encoding method of claim 6, wherein, based on either the first flag or the second flag being equal to 0, the L1 weight number information is not encoded but is derived to be 0.

11. A method for transmitting data for image information comprising:
- determining an inter-prediction mode of a current block;
- deriving motion information of the current block according to the determined inter-prediction mode;
- obtaining weighted prediction information for explicit weighted prediction of the current block;
- encoding the weighted prediction information to generate a bitstream; and
- transmitting the data comprising the bitstream,
- wherein the weighted prediction information includes weight number information,
- wherein the weight number information includes L0 weight number information specifying a number of weights signaled in an L0 direction and L1 weight number information specifying a number of weights signaled in an L1 direction,
- wherein the L0 weight number information is adaptively encoded based on a first flag specifying a position at which the weighted prediction information could be present while the L1 weight number information is adaptively encoded based on the first flag and a second flag indicating whether the explicit weighted prediction is applied to a bi-predictive (B) slice,
- wherein the first flag equal to 1 specifies that the weighted prediction information could be present in a picture header, and the first flag equal to 0 specifies that the weighted prediction information could be present in the slice header,
- wherein the second flag equal to 1 specifies that the explicit weighted prediction is applied to the B slice, and the second flag equal to 0 specifies that the explicit weighted prediction is not applied to the B slice, and
- wherein, based on the first flag and the second flag being equal to 1, the L1 weight number information is encoded into the bitstream.

* * * * *